United States Patent [19]

Mazies et al.

[11] Patent Number: 5,691,696
[45] Date of Patent: Nov. 25, 1997

[54] SYSTEM AND METHOD FOR BROADCASTING COLORED LIGHT FOR EMERGENCY SIGNALS

[75] Inventors: Timothy J. Mazies, Oak Forest; Jerry L. Williams, Tinley Park, both of Ill.; William J. Cassarly, Richmond Hts., Ohio

[73] Assignees: Federal Signal Corporation, Oak Brook, Ill.; General Electric Company, Schenectady, N.Y.

[21] Appl. No.: 525,833

[22] Filed: Sep. 8, 1995

[51] Int. Cl.$^6$ ............................................. B60Q 1/52
[52] U.S. Cl. ..................... 340/471; 340/468; 340/475; 340/472; 362/32; 362/61
[58] Field of Search ........................ 340/471, 472, 340/815.42, 815.43, 468, 555, 473, 475, 479; 359/237, 238; 362/32, 61, 80, 293

[56] References Cited

U.S. PATENT DOCUMENTS

| | | | |
|---|---|---|---|
| 2,858,478 | 10/1958 | Kershaw . | |
| 2,902,624 | 9/1959 | Wright . | |
| 3,536,908 | 10/1970 | Oster | 240/10.1 |
| 3,764,799 | 10/1973 | Schulz | 240/24 |
| 4,023,887 | 5/1977 | Speers | 240/24 |
| 4,104,615 | 8/1978 | Hunter | 340/84 |
| 4,236,191 | 11/1980 | Martinez | 362/32 |
| 4,360,758 | 11/1982 | Thorton, Jr. et al. . | |
| 4,471,385 | 9/1984 | Hyatt | 362/32 |
| 4,473,866 | 9/1984 | Davis | 362/35 |
| 4,521,771 | 6/1985 | Alton | 362/35 |
| 4,528,617 | 7/1985 | Blackington | 362/35 |
| 4,626,966 | 12/1986 | Bleiwas et al. | 362/35 |
| 4,704,660 | 11/1987 | Robbins | 362/32 |
| 4,799,753 | 1/1989 | Breitbarth et al. . | |
| 4,868,718 | 9/1989 | Davenport et al. | 362/32 |
| 4,887,190 | 12/1989 | Sadamune et al. | 362/32 |
| 4,894,591 | 1/1990 | Witting | 315/248 |
| 4,930,049 | 5/1990 | Davenport et al. | 362/32 |

(List continued on next page.)

FOREIGN PATENT DOCUMENTS

| | | |
|---|---|---|
| 0 560 750 A | 3/1992 | European Pat. Off. . |
| 559914 A1 | 9/1993 | European Pat. Off. . |
| 0 556 361 A2 | 10/1993 | European Pat. Off. . |
| 24 07 451 | 8/1975 | Germany . |
| 3434536 | 3/1986 | Germany . |
| 19093 | 10/1993 | Japan . |
| 700829 | 12/1953 | United Kingdom . |
| 1570684 | 7/1980 | United Kingdom . |
| 1584690 | 2/1981 | United Kingdom . |
| 2 238 109 | 5/1991 | United Kingdom . |
| WO 82/01942 | 6/1982 | WIPO . |
| A 96 23674 | 8/1996 | WIPO . |

OTHER PUBLICATIONS

Examiner's Search Report to the Comptroller under Section 17 on Application No. GB 9601359.4.

Yunfen Ji and Robert Wolsey, "Dimming Systems for High–Intensity Discharge Lamps", *Lighting Answers*, pp. 1–8, vol. 1, No 4, Sep. 1994.

(List continued on next page.)

*Primary Examiner*—Jeffery Horsass
*Assistant Examiner*—Timothy Edwards, Jr.
*Attorney, Agent, or Firm*—Leydig, Voit & Mayer, Ltd.

[57] ABSTRACT

A lighting system and method for broadcasting colored lights as emergency warning signals from a light source. A centralized continuous light source is coupled via a fiber optic transmission medium to an external display location such as a lens or the like located on a vehicle. The color and the relative intensity of each color is periodically modulated to alternate between at least two states such that the contrast between these alternating states is perceived by observers to be a flashing source of light with no off-time. The frequency and the duty cycle of the repetition rate of alternating between the states may be further controlled to better draw attention to the light source. In one embodiment, the external display locations include optical converters, each converter having multiple input facets and optically arranged to broadcast light received at its facets at predetermined vertical and horizontal output angles.

22 Claims, 23 Drawing Sheets

U.S. PATENT DOCUMENTS

| | | | |
|---|---|---|---|
| 4,949,227 | 8/1990 | Finch et al. | 362/61 |
| 4,958,263 | 9/1990 | Davenport et al. | 362/32 |
| 4,972,120 | 11/1990 | Witting | 313/638 |
| 5,009,617 | 4/1991 | Thomas | 439/679 |
| 5,010,319 | 4/1991 | Killinger | 439/679 |
| 5,042,894 | 8/1991 | Swemer | 315/291 |
| 5,047,695 | 9/1991 | Allen et al. | 315/291 |
| 5,051,665 | 9/1991 | Garrison et al. | 315/287 |
| 5,053,765 | 10/1991 | Sonehara et al. | 340/815.31 |
| 5,122,933 | 6/1992 | Johnson | 362/32 |
| 5,184,883 | 2/1993 | Finch et al. | 362/32 |
| 5,195,162 | 3/1993 | Sultan et al. | 362/32 |
| 5,198,696 | 3/1993 | Dennis | 362/32 |
| 5,239,230 | 8/1993 | Mathews et al. | 313/571 |
| 5,257,168 | 10/1993 | Davenport et al. | 362/32 |
| 5,260,686 | 11/1993 | Kuo | 340/479 |
| 5,278,731 | 1/1994 | Davenport et al. | 362/32 |
| 5,311,410 | 5/1994 | Hsu et al. | 362/32 |
| 5,317,237 | 5/1994 | Allison et al. | 315/307 |
| 5,341,445 | 8/1994 | Davenport et al. | 385/39 |
| 5,343,367 | 8/1994 | Davenport et al. | 362/32 |
| 5,365,413 | 11/1994 | Krammer | 362/32 |
| 5,396,571 | 3/1995 | Saadatmanesh et al. | 385/33 |
| 5,452,188 | 9/1995 | Green et al. | 362/227 |
| 5,469,337 | 11/1995 | Cassarly et al. | 362/32 |
| 5,475,285 | 12/1995 | Konopka . | |
| 5,528,714 | 6/1996 | Kingstone et al. | 385/100 |
| 5,559,911 | 9/1996 | Forkner et al. | 385/33 |
| 5,563,588 | 10/1996 | Belfer | 340/907 |
| 5,585,782 | 12/1996 | Yosko | 348/471 |

OTHER PUBLICATIONS

John F. Waymouth, "Electric Discharge Lamps," by M.I.T. Press, Cambridge, MA, Reprinted in *Monographs in Modern Electrical Technolgy*, Alexander Kusko, Series Editor, 6 pages.

Advertisement by Lumenyte International Corp., Costa Mesa, California 92626, on "Pype Lite® Fiber Optic Underwater Lighting", bearing a copyright notice of Oct. 19, 1992.

Brochure entitled "Fiber Optic Lighting At Its Best", by Lumenyte International Corp., Costa Mesa, California 92626, bearing a copyright notice of Mar. 2, 1993.

Product Brochure by Lumenyte International Corporation, Costa Mesa, California 92626 (Jul. 13, 1993).

Advertisement by Sharp Electronics Corporation, Simulated Screen Images, LCD Product Group (1994).

Projection Displays—1994 Tutorial, Presented by Fred Kahn, Kahn Int'l Consulting in Santa Clara Convention Center, Dec. 9, 1994.

"Lightpaint" list prices, Nov. 1994 by Lighting Technology.

Article on "RGB Unit" by Lighting Technology, London (no date).

Brochure on Product Specifications by Cable Lite™ Corporation, Dallas, Texas 75244 (no date).

Dan McCosh, "Automotive Newsfront", *Popular Science*, 32–34 & 38–39 Jul. 1990.

"KKK–A–1822C Federal Specification for Ambulances", by General Services Administration, Federal Supply Service, Washington D.C. 20406, 17–20 (no date).

Brochure entitled "Micro Power–Light Das neue Mikro–Gasentladungslicht (D1)", by *Phillips*, (no date).

Brochure entitled "The D1 gas discharge lamp for automobile headlights", (no date).

Brochure entitled "HI–Lux™ Lamps", by Welch Allyn, Lighting Products Division, Skaneateles Falls, NY 13153–0187, 5 pgs. (no date).

"High Intensity Discharge Automotive Lighting", by Inland Fisher Guide Division, Warren, Michigan 48092–5905 and Hughes Power Products, Culver City, California 90230 (HPP 9/1994).

"Price List for H.I.D. (High Intensity Discharge) Products", by Whelen Engineering Company, (effective date Jun., 1994).

Brochure entitled "H.I.D. High Intensity Discharge Solid State Light Source for Revolving Beasonic", by Whelen® Engineering Company, Chester, Connecticut 06412–0684, bearing a copyright notice of 1994.

Brochure entitled "VARI*LITE The Automated Lighting Company", bearing a copyright notice of 1994 Vari–Lite, Inc.

Advertisement by Lumenyte International Corp., Costa Mesa, California 92626, on "Lumenyte® Perimeter Lighting Systems", bearing a copyright notice of Mar. 4, 1993.

LIGHT ENGINE $22_1$, MODE 1

| TIME | 30% | 40% | 30% |
|---|---|---|---|
| LIGHT $19_1$ COLORS | WHITE | RED | RED |
| LIGHT $19_2$ COLORS | WHITE | RED | RED |
| LIGHT $19_3$ COLORS | WHITE | RED | RED |
| LIGHT $19_4$ COLORS | WHITE | RED | RED |
| INTENSITY | 35W | 60W | 84W |

← 81

LIGHT ENGINE $22_2$, MODE 1

| TIME | 30% | 40% | 30% |
|---|---|---|---|
| LIGHT $19_5$ COLORS | WHITE | RED | RED |
| LIGHT $19_6$ COLORS | WHITE | RED | RED |
| LIGHT $19_7$ COLORS | AMBER | RED | RED |
| LIGHT $19_8$ COLORS | WHITE | RED | RED |
| INTENSITY | 35W | 60W | 84W |

← 82

LIGHT ENGINE $22_3$, MODE 1

| TIME | 30% | 40% | 30% |
|---|---|---|---|
| LIGHT $19_9$ COLORS | WHITE | RED | RED |
| LIGHT $19_{10}$ COLORS | BLACK | AMBER | AMBER |
| LIGHT $19_{11}$ COLORS | WHITE | RED | RED |
| LIGHT $19_{12}$ COLORS | BLACK | WHITE | WHITE |
| INTENSITY | 35W | 60W | 84W |

LIGHT ENGINE $22_4$, MODE 1

| TIME | 50% | 50% |
|---|---|---|
| LIGHT $19_{13}$ COLORS | RED | RED |
| LIGHT $19_{14}$ COLORS | RED | RED |
| LIGHT $19_{15}$ COLORS | RED | RED |
| LIGHT $19_{16}$ COLORS | RED | RED |
| INTENSITY | 35W | 84W |

← 84

LIGHT ENGINE $22_5$, MODE 1

| TIME | 30% | 40% | 30% |
|---|---|---|---|
| LIGHT $19_{17}$ COLORS | WHITE | RED | RED |
| LIGHT $19_{18}$ COLORS | WHITE | RED | RED |
| LIGHT $19_{19}$ COLORS | AMBER | RED | RED |
| LIGHT $19_{20}$ COLORS | WHITE | RED | RED |
| INTENSITY | 35W | 60W | 84W |

LIGHT ENGINE $22_1$, MODE 2

| TIME | 30% | 40% | 30% |
|---|---|---|---|
| LIGHT $19_1$ COLORS | BLUE | RED | RED |
| LIGHT $19_2$ COLORS | BLUE | RED | RED |
| LIGHT $19_3$ COLORS | BLUE | RED | RED |
| LIGHT $19_4$ COLORS | BLUE | RED | RED |
| INTENSITY | 35W | 60W | 84W |

← 91

LIGHT ENGINE $22_2$, MODE 2

| TIME | 30% | 40% | 30% |
|---|---|---|---|
| LIGHT $19_5$ COLORS | BLUE | RED | RED |
| LIGHT $19_6$ COLORS | BLUE | RED | RED |
| LIGHT $19_7$ COLORS | AMBER | RED | RED |
| LIGHT $19_8$ COLORS | BLUE | RED | RED |
| INTENSITY | 35W | 60W | 84W |

← 92

LIGHT ENGINE $22_3$, MODE 2

| TIME | 30% | 40% | 30% |
|---|---|---|---|
| LIGHT $19_9$ COLORS | BLUE | RED | RED |
| LIGHT $19_{10}$ COLORS | BLACK | AMBER | AMBER |
| LIGHT $19_{11}$ COLORS | BLUE | RED | RED |
| LIGHT $19_{12}$ COLORS | BLUE | RED | RED |
| INTENSITY | 35W | 60W | 84W |

LIGHT ENGINE $22_4$, MODE 2

| | | | |
|---|---|---|---|
| TIME | 50% | 50% | ← 94 |
| LIGHT $19_{13}$ COLORS | RED | RED | |
| LIGHT $19_{14}$ COLORS | RED | RED | |
| LIGHT $19_{15}$ COLORS | RED | RED | |
| LIGHT $19_{16}$ COLORS | RED | RED | |
| INTENSITY | 35W | 84W | |

LIGHT ENGINE $22_5$, MODE 2

| | | | | |
|---|---|---|---|---|
| TIME | 30% | 40% | 30% | ← 95 |
| LIGHT $19_{17}$ COLORS | BLUE | RED | RED | |
| LIGHT $19_{18}$ COLORS | BLUE | RED | RED | |
| LIGHT $19_{19}$ COLORS | AMBER | RED | RED | |
| LIGHT $19_{20}$ COLORS | BLUE | RED | RED | |
| INTENSITY | 35W | 60W | 84W | |

FIG. 10D

SYSTEM AND METHOD FOR BROADCASTING COLORED LIGHT FOR EMERGENCY SIGNALS

CROSS-REFERENCE TO RELATED APPLICATIONS

The present application is related to the following copending U.S. Patent Applications: "System and Method for Broadcasting Colored Light for Emergency Signalling," Ser. No. 08/382,647 by Williams et al., "A Compact Uniform Beam Spreader for a High Brightness Centralized Lighting System," by William J. Cassarly, Timothy J. Mazies, John M. Davenport and Richard J. Hansler, Ser. No. 08/382,717, and "Flashing Lighting System Using a Discharge Light Source," by Joseph M. Allison, William J. Cassarly, John M. Davenport, Richard J. Hansler, Jacek J. Jozwik, Dennis J. Hilburger and Jerry L. Williams, Ser. No. 08/382,713, all filed on Feb. 2, 1995.

1. Field of the Invention

The present invention relates generally to lighting systems, and more particularly to a centralized lighting system for emergency vehicle lights.

2. Background of the Invention

Presently, emergency vehicles, including ambulances, police vehicles, and emergency fire apparatus vehicles, output visible warning signals through the use of a beacon or a light bar mounted thereon, or via flashing strobe lights built into the body of the vehicle. A beacon ordinarily houses a continuous light source radiated by a rotating reflector, while a light bar typically contains a number of flashing (strobing) light sources or light sources radiated by rotating mirrors. A flashing strobe light built into the body of the vehicle is typically covered by a plastic lens or the like to increase its visibility and to achieve a specific color.

To ensure effectiveness, these lighting systems are required to meet certain performance specifications, such as those proposed by the Ambulance Manufacturers Division of the National Truck Equipment Association, AMD Standard 016. Another ambulance specification, General Services Administration Specification KKK-A-1822C, requires a minimum number of lights disposed at specific display locations on the vehicle and arranged to radiate the light in a certain manner.

With a beacon, a motorized driving mechanism rotates a parabolic reflector in order to alternately block and focus the light radiated to a given location so that the light appears to observers to be intermittent rather than continuous. The driving mechanism includes a relatively large motor, making such beacon systems rather inefficient. Beacons are also limited to flashing one color based on the color of the transparent housing surrounding the bulb and reflector.

With strobing bulbs, the desired intermittent light patterns are accomplished by repeatedly flashing one or more of the bulbs on and off. For example, in a light bar some of the lights are color-filtered so that observers can better differentiate between these emergency lights and the white and red lights of ordinary vehicles, and so that observers can distinguish among the different types of emergency vehicles. However, in order to display a variety of colors, a number of bulbs must be provided at different display locations in the light bar, each bulb radiating through its own colored glass or the like. Moreover, in addition to emergency lights, other lights may be added to an emergency vehicle. For example, an ambulance is typically outfitted with scene lights, and also load lights, to continuously illuminate the various areas around the vehicle when parked or to facilitate the loading of a person.

Although functional, light bars, strobe lights and rotating beacons have a number of additional drawbacks associated therewith. One drawback common to all three types of lights is that the bulbs often fail as a result of road-induced failures of the filaments therein due to shock and vibration. The high failure rate necessitates the frequent performance of time-consuming testing and maintenance procedures. The operating life of these conventional filament-based bulbs is typically on the order of 300 hours.

Consideration must also be given to the design and adaptation of vehicles for the subsequent installation of emergency lights. Significant mounting hardware and wiring is required to add light bars or beacons to a vehicle, or to build strobe lights into a vehicle, particularly when converting an otherwise standard vehicle to an emergency vehicle. Moreover, the mounting of either a beacon or a light bar onto the vehicle can result in a reduction in the vehicle's aerodynamics.

Another drawback that results from the mounting of light bars or beacons onto emergency vehicles is that the vehicles necessarily become more conspicuous, even at times when no emergency is present and the lights are not activated. This is undesirable in certain situations. By way of example, police officers often desire to have their police cars remain inconspicuous, such as when situating themselves to observe potential traffic offenders.

Finally, ambulances need to have a very stable, high-capacity power source so that the sensitive medical equipment present therein operates properly. However, flashing intermittent lights produce large, uneven power demands and can generate unpredictable electronic noise. Accordingly, ambulances having conventional flashing lights must be provided with a well-regulated, uninterruptible power source and adequate shielding, such as by adding electronic filtering and/or a completely separate power system. This increases the complexity and cost of the vehicle.

OBJECTS AND SUMMARY OF THE INVENTION

Accordingly, it is an object of the present invention to provide an emergency vehicle lighting system that provides warning lights to meet emergency vehicle lighting specifications without employing filament-containing bulbs.

Another object is to provide a lighting system as characterized above that enables each display location on the vehicle to broadcast light in one or more distinct colors.

It is a related object to provide such a lighting system that utilizes a continuous light source to efficiently provide a contrasting light pattern without requiring rotating reflector.

It is another object to provide a lighting system as characterized above that may be incorporated into a vehicle without significantly altering the profile of the vehicle, thereby maintaining the vehicle's aerodynamics while allowing it to remain inconspicuous when necessary.

It is another object to simplify the installation and maintenance of an emergency lighting system in a vehicle.

It is also an object to provide a lighting system of the above kind that draws power in a substantially constant manner.

Another object is to provide an emergency lighting system that broadcasts multiple types of emergency lighting signals, such as modulated emergency signals, scene lighting and load lighting, from a single optical converter.

Briefly, the invention provides an optical converter for broadcasting lighting signals from a vehicle including at least a first beam and a second beam of continuous light having a distinct spatial separation. The converter preferably includes a plurality of input facets for injecting light into it via fiber optic light pipes connected to one or more light sources.

Other objects and advantages will become apparent from the following detailed description when taken in conjunction with the attached drawings, in which:

BRIEF DESCRIPTION OF THE DRAWINGS

FIGS. 10A–10D comprise a memory map for storing representative operating parameters for controlling a lighting system constructed in accordance with the invention;

FIG. 20(b) is a front plan view of the Fresnel lens forming the output facet of the converter illustrated in FIG. 20(a);

FIG. 20(c) is a profile illustrating the serrations of a conventional Fresnel lens such as the lens of FIGS. 20(a) and 20(b)

Figure 1:
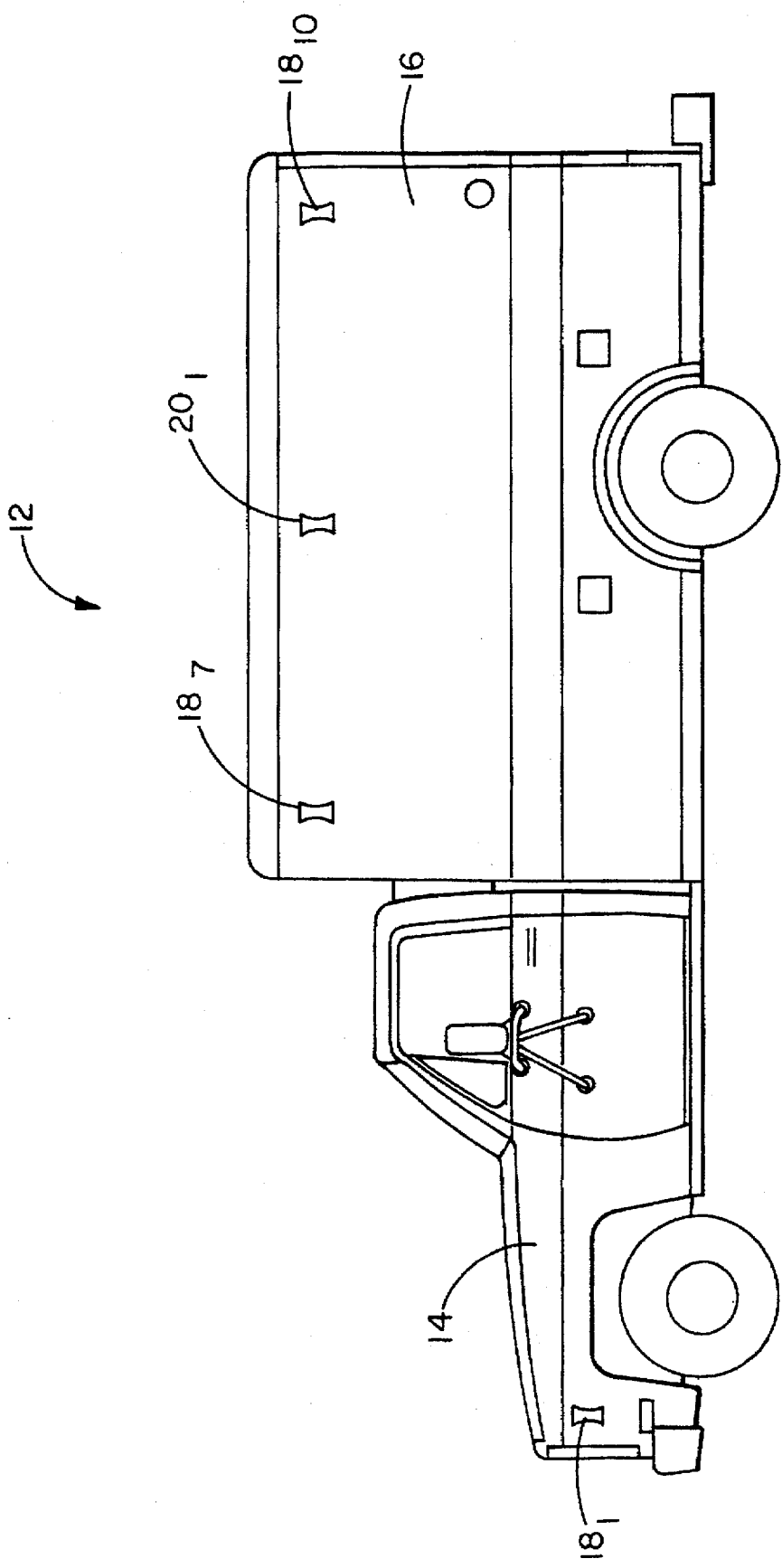
FIG. 1 is a side elevational view of an emergency vehicle such as an ambulance showing a number of general display locations for situating emergency lights.

While the invention is amenable to various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention as expressed in the appended claims.

DETAILED DESCRIPTION OF THE PREFERRED EMBODIMENT

Figure 2:
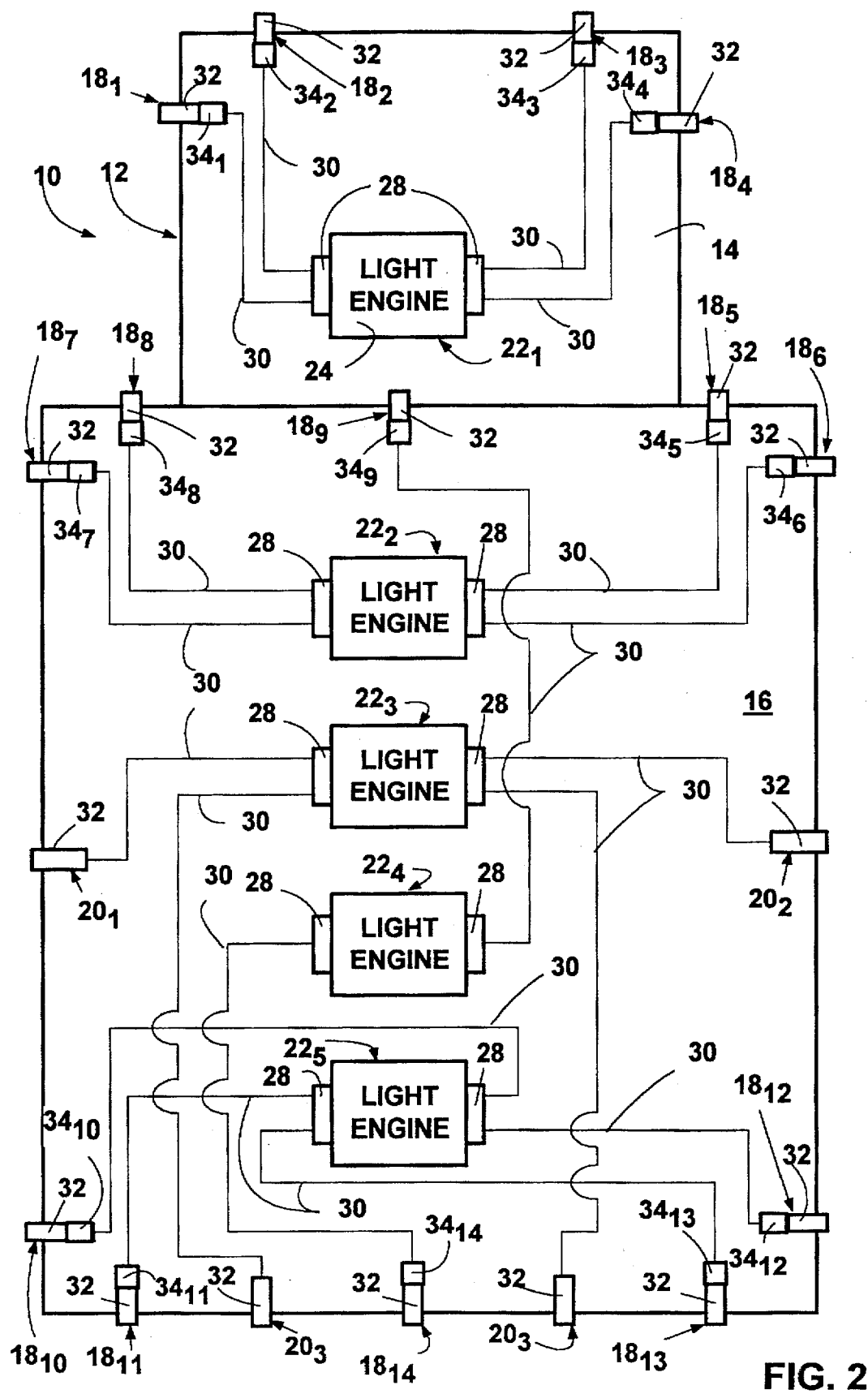
FIG. 2 is a plan view of an emergency vehicle such as the ambulance of FIG. 1 and constructed in accordance with the invention, illustrating a block diagram of high intensity discharge lamps and their optical transmission paths for connecting the lamps to a number of display locations.

Turning now to the drawings and referring first to FIGS. 1 and 2, there is shown a lighting system generally designated 10 incorporated into a vehicle 12 and constructed in accordance with the present invention. In one embodiment, the vehicle 12 is an ambulance including a forward portion 14 and a rear portion 16.

Figure 3B:
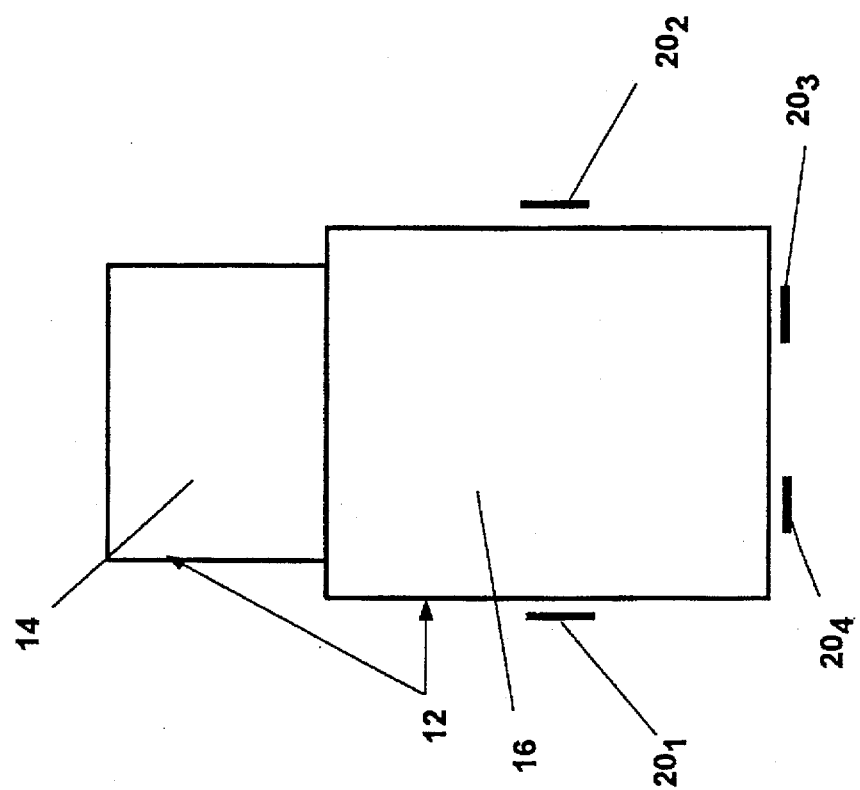
FIGS. 3A and 3B are top views representative of a particular manner of deploying a lighting system on an ambulance, showing the general location of emergency lights and scene lights, respectively.
Figure 3A:
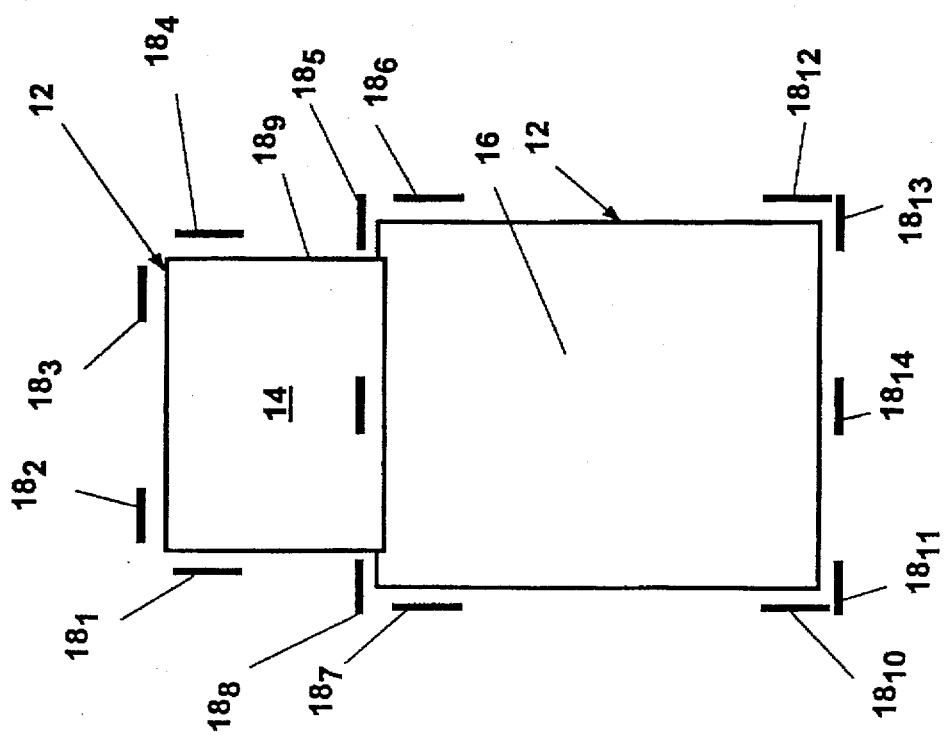

An ambulance lighting system may comprise a combination of two separate lighting systems as best shown in FIGS. 3A and 3B. In such a configuration, the first system (FIG. 3A) includes a plurality of emergency lights $18_1$–$18_{14}$ disposed around both the front portion 14 and the rear portion 16 of the vehicle 12. The emergency lights $18_1$–$18_{14}$ are activated to signal observers outside of the vehicle of an emergency situation. The second system (FIG. 3B) includes a plurality of auxiliary, or scene lights $20_1$–$20_4$ located on the rear portion 16 of the vehicle 12 at the rear, right and left sides thereof. The scene lights $20_1$–$20_4$ are ordinarily used to illuminate the side and rear areas around a parked ambulance to facilitate the loading of a person. The particular configuration illustrated in FIGS. 3A and 3B satisfies ambulance lighting design specifications such as General Services Administration Specification KKK-A-1822C, which sets forth the minimum number of light sources required on an ambulance and their locations.

In accordance with one aspect of the invention and as shown in FIG. 2, the light is piped from one or more light sources (e.g., $22_1$) centrally disposed in an interior location of the emergency vehicle 12 to the exterior thereof. Unlike conventional lighting systems, in the preferred embodiment the light sources are not ordinarily intended to be directly visible from a viewpoint external to the vehicle. Indeed, the light sources may be installed at any convenient location in the vehicle 12, such as mounted to the vehicle floor behind or underneath the front seats.

Figure 4:
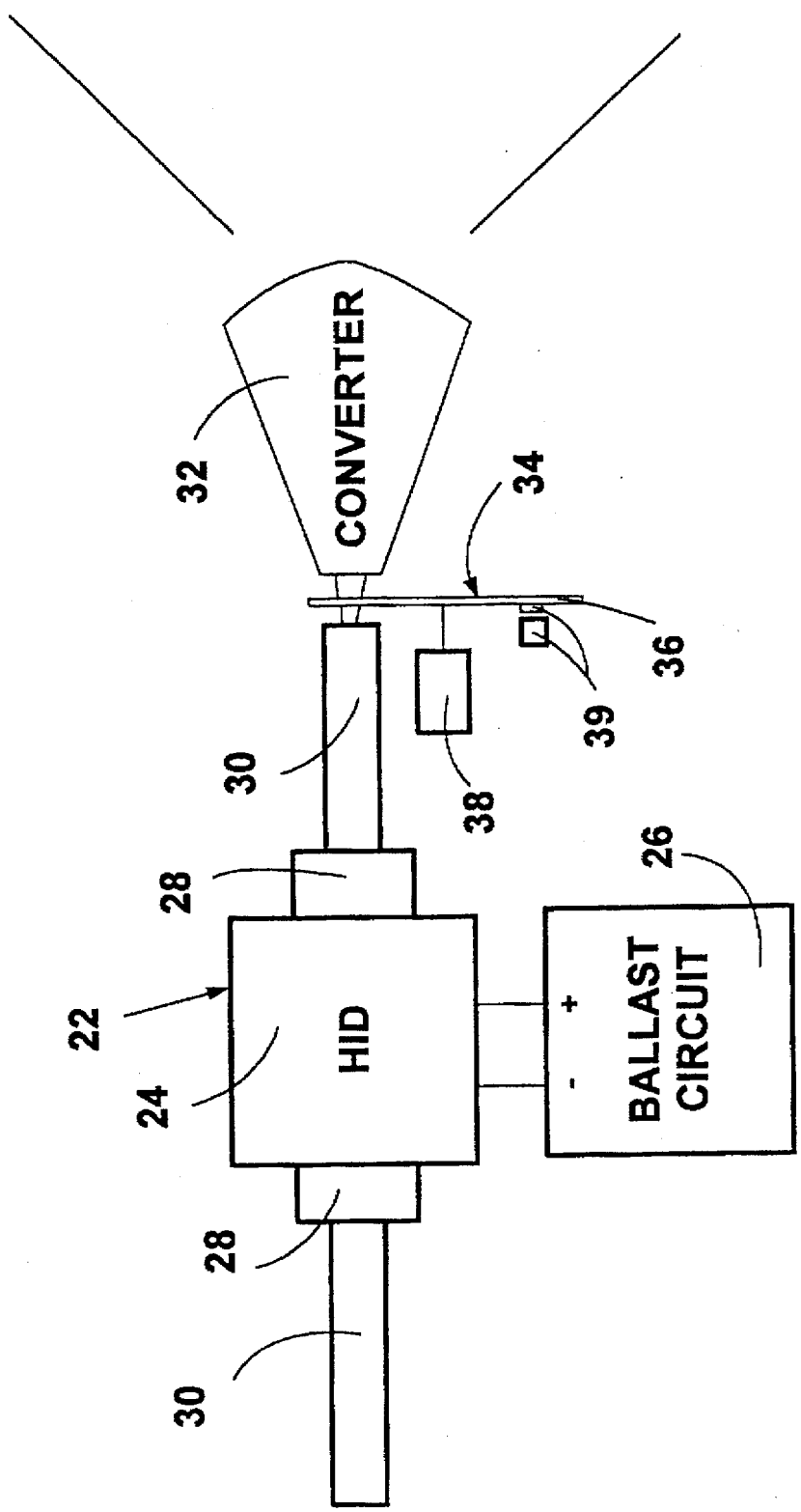
FIG. 4 is a block diagram illustrating one manner of connecting the lamps to the light distribution converters through a filter.

As shown in FIG. 4, each light source, alternatively referred to as a light engine 22, preferably comprises a high intensity discharge lamp (HID) 24, a ballast circuit 26 for supplying an appropriate amount of power to operate the HID 24, and one or more ports 28 for coupling fiber optic light pipes (or bundles) 30 thereto. Such light engines 22 may utilize a xenon-metal halide lamp operated by a low-voltage ballast circuit in order to continuously provide broadband light as described in U.S. Pat. Nos. 5,047,695 and 5,317,237. These light engines 22 provide light on the order of 2,000 to 15,000 lumens of light and have operating lives of approximately 3000 to 5000 hours. (A relatively low voltage signal provided to the ballast circuit modulates the output power level as described in more detail below.) One type of light engine particularly suitable for use in the present lighting system 10 is manufactured by General Electric Corporation. This type of light is capable of continuous operation at sixty watts, with a peak power level in excess of this average when combined with operating periods below this average power provided that an overall average power level of sixty watts is maintained.

Thus, as shown in FIG. 2, the emergency vehicle 12 described herein has a number of light engines $22_1$–$22_5$ disposed in the interior thereof coupled to the fiber optic light pipes 30. The light pipes 30 in turn act as a transmission medium to transmit the continuous broadband light from the light engines $22_1$–$22_5$ towards the exterior of the vehicle 12. Small openings are made in the vehicle body to allow the light to be broadcast therefrom. As utilized herein, the term "continuous" is intended to mean lights that, when activated, are not intermittently illuminated and extinguished, and may generally appear to be continuous to a human observer, as distinguished from strobing lights which are alternately illuminated and extinguished. Thus, continuous lights include lights that are constantly ignited, illuminated or arcing as well as those that are pulsed at a high enough frequency wherein the individual pulses are not individually distinguishable from one another. As used herein, continuous lights may also vary in intensity (such as described in the related copending U.S. Patent Application entitled "Flashing Lighting System Using a Discharge Light Source," by Joseph M. Allison et al., Ser. No. 08/382,713, filed Feb. 2, 1995) and still be considered continuous. In addition, the term "broadband" is intended to mean light comprising a mixture of visible frequencies of light, typically appearing in combination as various shades of white.

The light pipes 30 are preferably acrylic-based and have an elliptical cross-section. The elliptical shape provides desirable dispersion characteristics and further allows one such pipe to be conveniently extended lengthwise atop another. Light pipes of this type are commercially available from Lumenyte Corporation, Costa Mesa, Calif.

To prevent the heat of the light engines $22_1$–$22_n$ from damaging the light pipes 30, the light pipes 30 may be coupled to the light engines $22_1$–$22_n$ through a cylindrically-shaped piece of quartz or other such material. In addition, the quartz may be doped to dissipate ultraviolet light. For efficiency, the light engines $22_1$–$22_n$ contain ellipsoidal mirrors, the lamp at one focus of the ellipsoid and the receiving end of the light pipe 30 (or quartz coupling) positioned at the other focus. Once the light enters the light pipe 30, the transmission of light therethrough to the external display locations takes place in a well known manner.

At each display location, a light converter 32 is inserted through an opening in the vehicle 12, and functions as a lens to radiate the light exiting the light pipe 30 in a desirable manner, generally outwardly from the vehicle 12. For example, one such lens diffracts the light with minimal diffusion to increase the illumination angle from an approximately thirty degree cone of light to approximately ninety degrees in the horizontal plane. In the vertical plane, the converters 32 typically diffract the light between approximately twenty and thirty degrees, satisfying typical specifications which require minimum candela readings at ten degrees vertical. The converters 32 also serve to protect the interior of the vehicle 12 from the outside elements, and may be made of transparent plastic or glass. Alternatively, the converters 32 may be configured as light diffusers in order to scatter the light and increase the apparent area of the light source to an external observer.

As can be appreciated, the lighting system 10 is relatively easy to install in a vehicle, since only a small opening needs to be drilled or cut through the vehicle body to provide a passageway for one of the converters 32, or one of the light pipes 30 or light therefrom to pass through. Each converter 32 is inserted through its corresponding opening and preferably sealed around its periphery (such as with a rubber grommet) to function as both a lens and a protective barrier as previously described. Moreover, because the effective exposed area of the converters 32 is small in size with respect to conventional beacons or light bars, the profile of the vehicle 12 remains relatively unchanged. Thus, with the present invention the aerodynamic characteristics of a vehicle are substantially maintained, particularly when compared with police vehicles or the like having light bars or beacons thereon.

FIGS. 12A–12D illustrate optical converters 32 suitable for use with the present invention. Similar such converters are described in more detail in the related copending U.S. Patent Application "A Compact Uniform Beam Spreader for a High Brightness Centralized Lighting System," by William J. Cassarly et al., Ser. No. 08/382,717, filed Feb. 2, 1995.

Figure 12A:
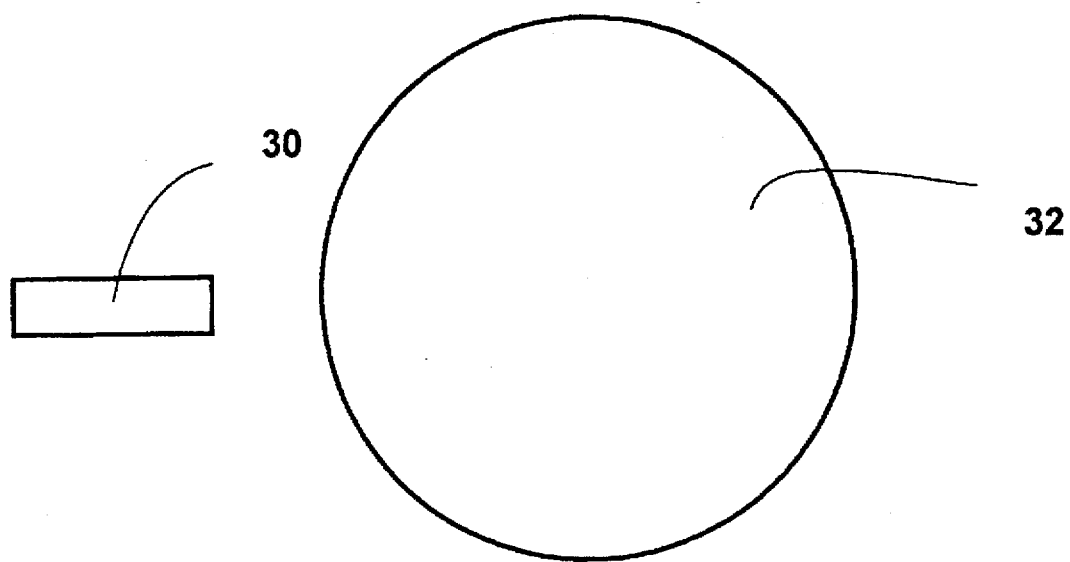
FIGS. 12A–12D are various views of optical converters suitable for use with a lighting system constructed in accordance with the invention.
Figure 12B:
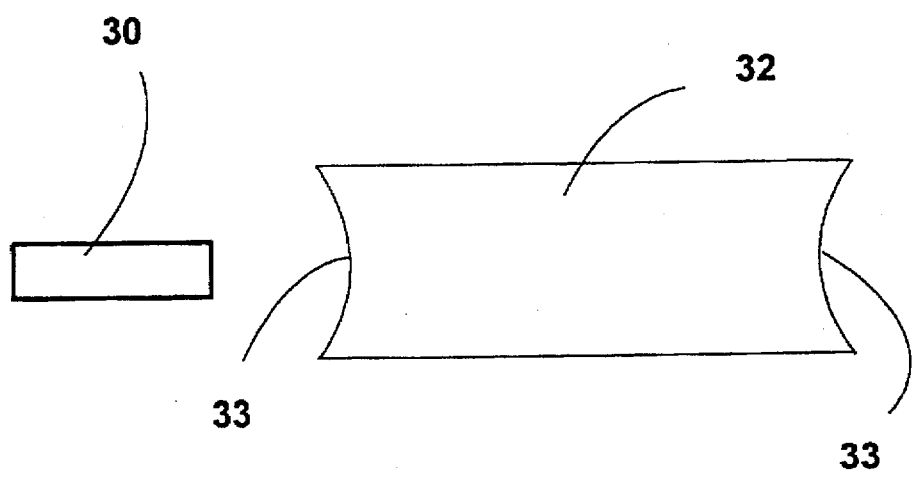

FIGS. 12A–12B are a side view and a top view, respectively, of a converter 32 optically coupled to an elliptical light pipe 30. The curved surfaces 33 minimize nulls in the output light distribution as described in the previously-identified Cassarly et al. Ser. No., 08/382,717. A converter 32 of this type has been utilized with the present invention in a prototype system configured in accordance with FIG. 9, and diffracts the light so as to meet ambulance lighting performance specifications, e.g., ninety degrees in the horizontal plane, thirty degrees in the vertical plane.

Figure 12C:
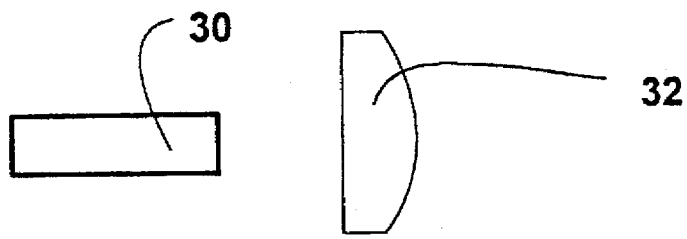

FIG. 12C is a top view of a converter 32 optically coupled to an elliptical light pipe 30, and configured as a planoconvex lens to refract and diffract the received light in a manner that is suitable for use with the present invention. A Fresnel lens having comparable optical refraction and/or diffraction characteristics may similarly be utilized as an optical converter 32.

Figure 12D:
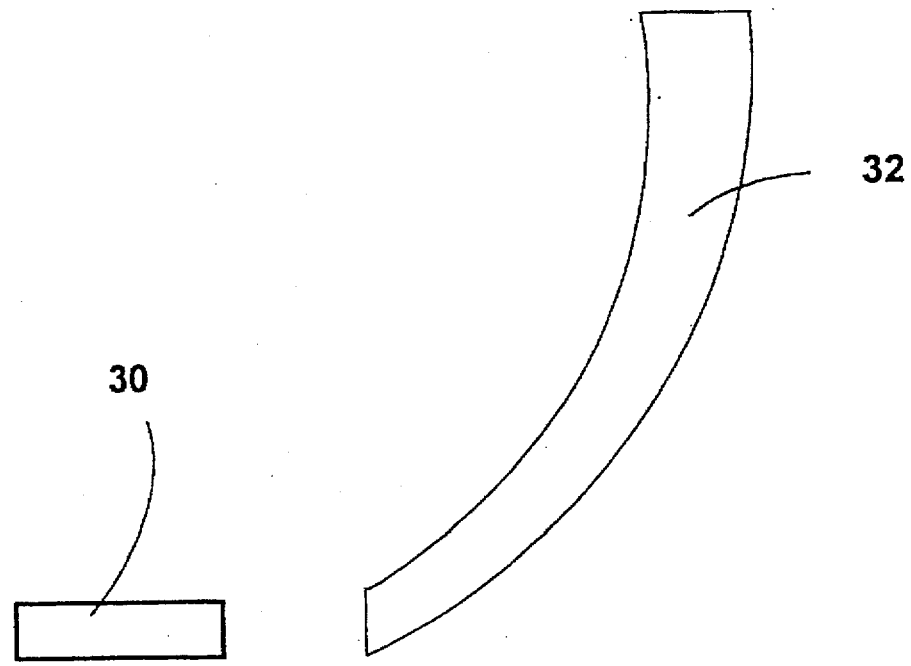

FIG. 12D is a top view of another type of converter 32 also suitable for use with the present invention. This converter 32 is configured for total internal reflection to bend the light received from the light pipe 30 approximately ninety degrees. The tapering of the converter 32 of FIG. 12D diverges the light in the desired manner for broadcasting from the vehicle 12.

In accordance with one aspect of the invention, at least some of the broadband light provided by the light engines $22_1$–$22_5$ is modulated in order to periodically change output states before being broadcast from the vehicle 12. Observers perceive the contrast between the different states as flashing. Moreover, in order to meet performance specifications for emergency vehicles, the light broadcast from the vehicle 12 must appear to observers to be flashing at rates characteristic of emergency vehicles, generally between 60 and 240 flashes per minute (one to four hertz) as standardized by the Society of Automotive Engineers (SAE J-845, SAE J-595, SAE J-1318) for emergency warning lights. Of course, these standard rates are not absolute, and thus the system 10 may be adapted for broadcasting light at other perceptible flash rates, for example rates ranging from 0.1 hertz to 10 hertz. The control circuitry for controlling the flash rate is described in more detail below.

Figure 7:
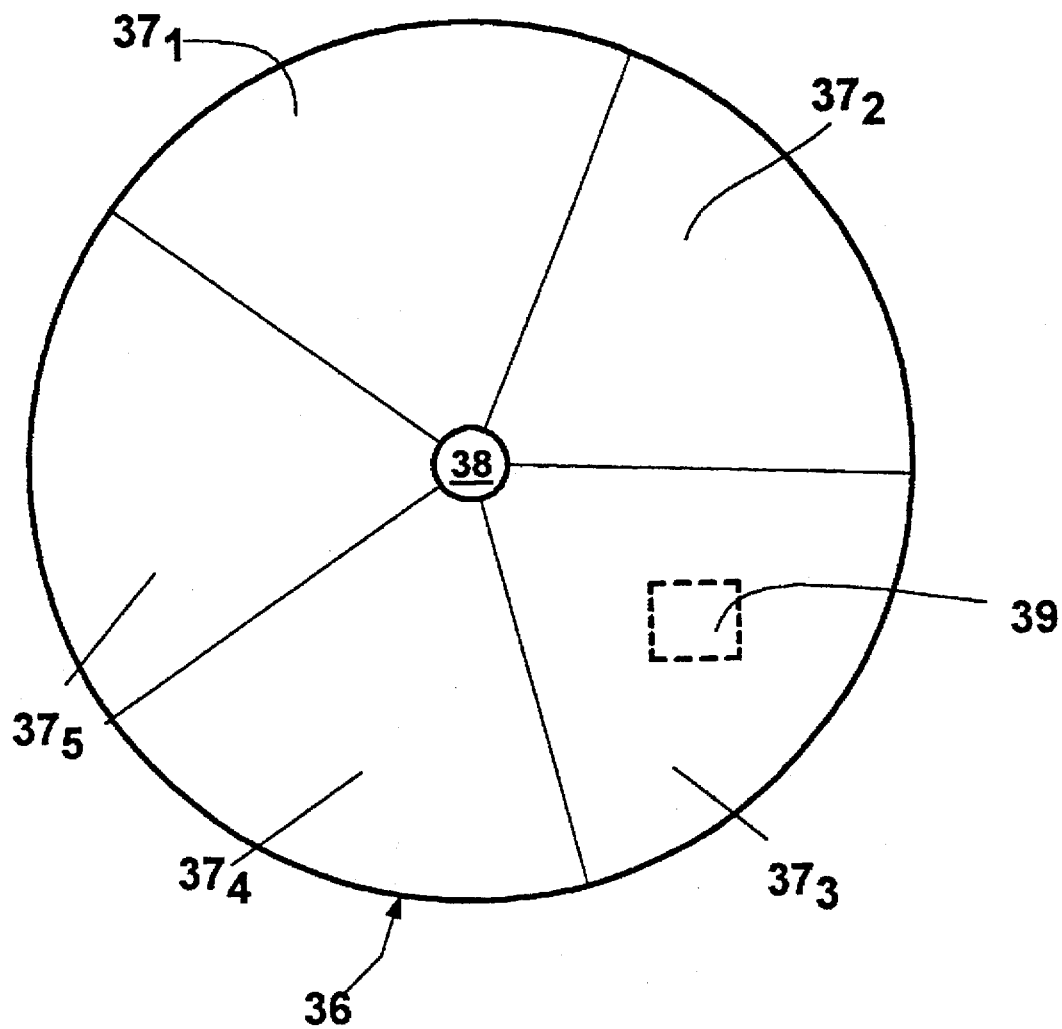
FIG. 7 is a front view illustrative of one type of filter suitable for use with the present invention.

One manner of modulating the light involves periodically modifying the spectral composition of the light broadcast from the vehicle 12 at selected converters 32 so as to provide lighting of the appropriate colors for that type of emergency vehicle, e.g., red, amber and white (unfiltered) for an ambulance. The color modulation is preferably performed by filtering the broadband light exiting selected light pipes 30 with a variable filter 34 before it reaches its corresponding optical converter 32. To this end, in one embodiment a color wheel 36 (FIG. 4, FIG. 7) having the desired color filters incorporated therein is disposed between the light pipes 30 and the optical converter 32 to serve as the variable filter 34. Alternatively it is feasible to immediately filter the light at the light engine 22, i.e., before it enters the fiber optic transmission path 30.

Regardless of the location that the filter 34 is inserted, by connecting the color wheel 36 to a motorized driving mechanism 38 (FIG. 4) for rotation, the light broadcast from the vehicle periodically changes its spectral composition at a rate dependent on the rotation of the color wheel 36. Of course, one of the sections (e.g., section $37_1$) in the color wheel 36 can be transparent to all wavelengths of visible light so that one of the broadcast states is white light. Alternatively, one of the sections (e.g., section $37_3$) of the color wheel 36 may be opaque to all frequencies of visible light, enabling the emulation of a conventional on-off flash pattern. Such an opaque section may also be used to block even low levels of light that may be present during a low-power standby mode, described in more detail below. Two or more selectively-oriented polarized filters may be arranged in series and coordinated to further increase the number of display patterns available.

In one embodiment of the invention, a plurality of color wheels 36 serve as the variable filters 34 and the motors 38 driving the color wheels 36 are stepper motors. This enables electrical output pulses to determine the direction and speed of rotation of each of the color wheels 36, thereby determining the settings of the variable filter 34 and consequently the colors of the light broadcasted from the vehicle 12, as well as the frequency and duty cycle of the flash rate. One suitable stepper motor is manufactured by Nippon Pulse Motor Co., Ltd., commercially available from Inland Stepper Motors, Sierra Vista, Ariz., Part No. PF42T-48.

Figure 5:
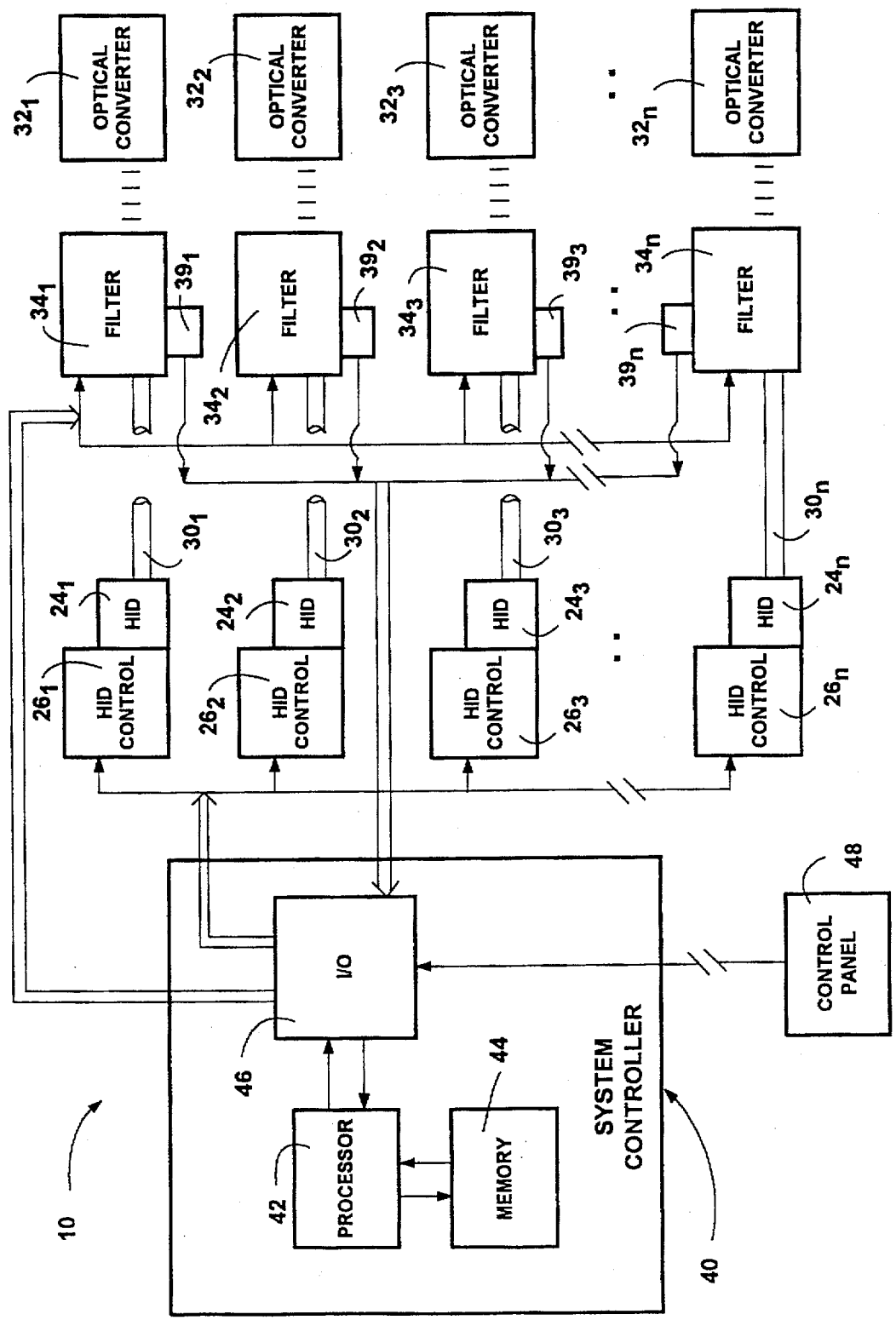
FIG. 5 is a block diagram of a circuit suitable for controlling a lighting system according to the present invention.

To modulate the spectral composition of the broadcasted light, a system controller 40 is provided as shown in FIG. 5. Preferably, the system controller 40 includes a processor 42 operatively connected to a memory 44, and interfaced to the filters $34_1$–$34_n$ through input/output (I/O) circuitry 46. A control panel 48 having at least one switch thereon is connected to the system controller 40 to allow the vehicle operator to select among preset flash patterns stored in the memory 44, depending on the type of emergency situation selected by the vehicle's operator. A similar system controller for controlling the flash patterns in an emergency vehicle is described in U.S. patent application Ser. No. 07/592,557, assigned to Federal Signal Corporation, University Park, Ill.

Figure 6:
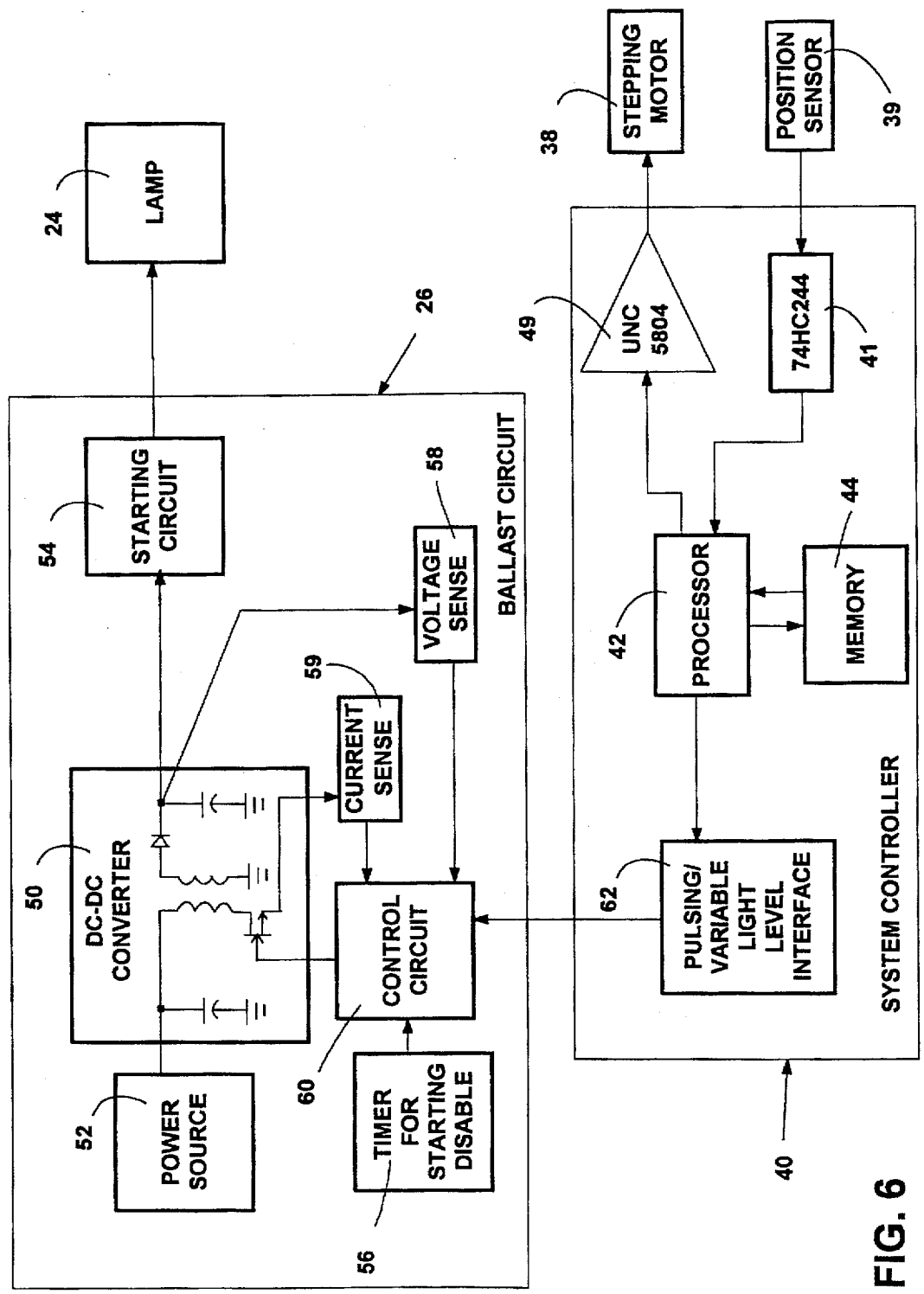
FIG. 6 is a block diagram of a circuit suitable for interfacing to the system controller of FIG. 5 to control the operation of the discharge lamps and filters.

To provide the current necessary for rotating the color wheels 36, the processor is connected to the stepper motor 38 through driver 49, which may be a UNC 5804 integrated circuit commercially available from Allegro Corporation. To position the color wheel, a position sensor 39 is mounted onto one of the sections of the color wheel, e.g., section $37_3$ (FIG. 7), to report the angular position to the processor 42. For example, the position sensor 39 may comprise a conductive strip or magnet in conjunction with a corresponding switch, such that the switch is closed at a certain angular position of the wheel. This provides the processor 42 with closed-loop control over the filter setting via control of the stepper motor 38. If an opaque section is present on the color wheel, the metal strip is affixed, e.g., glued, to that section since any blocking effect caused by the strip is irrelevant at that wheel position. As shown in FIG. 6, a buffer 41 such as a 74HC244 (TTL) integrated circuit may be used to connect the sensor 39 (and other such sensors) to the processor 42.

In one alternate embodiment, one or more of the filters 34 may include a dichroic mirror or the like that reflects only specified frequencies while passing the other spectral frequencies to modulate the light. In another alternate embodiment, the filters 34 may be electronic filters such as liquid crystal displays that enable voltage-controlled filtering of select wavelengths of light. In yet another embodiment, the filters 34 may comprise acousto-optic tunable filters which filter select wavelengths of light across the visible spectrum according to the frequency of an ultrasonic signal applied thereto. The use of electro-optic or acoustic optic filtering enables the system to function with no moving parts. When electro-optic filters are used to filter the light, the I/O circuitry 46 may include a D-A voltage converter to provide a variable voltage to the filter to determine the wavelengths filtered. Alternatively, a switching network may be included in the I/O circuitry 46 to enable controlled selection between two or more particular voltages. The switching network may similarly switch frequencies applied to an acousto-optic tunable filter thereby enabling selection of the wavelengths to filter.

Regardless of the filtering means 34 employed, since the available light is not strobed between a fully-on and fully-off state, all of the continuous light generated by the light engine 22 may be used. This may provide for improved recognition of the vehicle 12, while reducing the startling flashes that occur with conventional emergency lights.

Moreover, utilizing continuous light at varying states provides for significant flexibility in the lighting patterns broadcast to observers. For example, by controlling the amount of time that each color is broadcasted, such as by appropriately timing the positioning of the color wheel 36, the flashing colors may be utilized to convey additional information from the vehicle 12. By way of example, short red, long amber flashes may be used to indicate a vehicle moving at a high rate of speed, while long red, short amber may be used to indicate a slowed or stopped vehicle.

In addition to varying the spectral composition of the light, other characteristics of the broadcasted light may be modulated. In particular, the intensity of the light may be periodically varied such as to enhance the contrast between the colors. To this end, the intensity of the light engine 22 is controlled by an appropriate control circuit as described below.

It can readily be appreciated that, to a certain extent, the operation of filtering itself reduces the luminous intensity broadcasted as a function of the wavelength being passed. For example, a red filter reduces the intensity more than an amber filter, while the unfiltered state does not reduce the intensity at all. Thus, when alternating between red and white (unfiltered), the contrast may be enhanced by increasing the power driving the light engine 22 to increase the intensity of the lamp 24 during the white (unfiltered) state, while reducing the power (and intensity) during the red (filtered) state. So that the more intense white light does not overwhelm the less-intense red light from the perspective of a viewer, the "on" time of the red flash may be a longer duration with respect to the "on" time of the white flash. In other words, the duty cycle of the red may be greater than fifty percent, the white less than fifty percent. However, it can be appreciated that this is only one manner of coordinating the spectral composition and intensity.

Indeed, the intensity settings need not be varied in synchronization with the filter settings. For example, the intensity may be varied sinusoidally at three hertz while the colors are changed in discrete steps at two hertz. The lighting system 10 may be arranged such that the color changes may lag or lead the intensity change, be in or out of phase, or such that one or both of the modulations may vary randomly. Moreover, the colors need not change in discrete steps, particularly if electronic filters are used. However, as described herein, for simplicity the colors and intensities will be modulated, if at all, in synchronization.

To modulate the intensities, the system controller 40 is interfaced to the ballast circuits $26_1$–$26_n$ of the light engines $22_1$–$22_n$ through I/O circuitry 46. As can be appreciated, the I/O circuitry 46 may include commercially available components such as one or more digital-to-analog (D-A) voltage converters or switches connected to appropriate amplifiers or attenuators as needed for selectively providing control signals to the ballast circuits $26_1$–$26_n$ of the light engines $22_1$–$22_n$ to control the desired intensity. The I/O circuitry 46 may include electronic shielding, filters and/or opto-electronic isolators in order to eliminate ground loops, noise, crosstalk and the like.

As shown in FIG. 6, one such ballast circuit 26 includes a DC-to-DC converter 50, e.g., a flyback converter, for converting the voltage of a power source 52 such as a car battery to the level necessary for operating the high intensity discharge lamp 24. The ballast circuit 26 further includes a starting circuit 54 to generate high voltage pulses needed for igniting the lamp 24. These high-voltage pulses are generated until the lamp 24 is ignited, or until they are disabled by a timer circuit 56 should the lamp fail to ignite after a predetermined period of time.

Shortly after ignition, the lamp 24 is at a temperature below its regular operating temperature, resulting in poor light output efficiency and a low operating voltage. A voltage sensor circuit 58 detects this condition, and reports it to a control circuit 60, which is further connected to a current sensor circuit 59. The control circuit 60, which comprises a differential amplifier connected to adjust for the sensed current and voltage levels of the lamp 4, boosts the power to the lamp, e.g., by a factor of two, at the low voltage condition. As is well-known in these types of DC-to-DC converters, the power supplied to the lamp 24 is controlled by the frequency of a switching pulse that discharges the primary transformer in the DC-to-DC converter 50. The control circuit 60 is preferably arranged such that the switching frequency is nominally centered around thirty kilohertz so as to be above audible frequencies.

The increase in power generated by the control circuit 60 at the sensed low voltage condition increases the light output, and as a further benefit reduces the amount of time that it takes for the lamp 24 to reach its regular operating temperature. As the lamp temperature increases, the voltage across the lamp 24 gradually increases. As the voltage sensor circuit 58 detects this, control circuit 60 appropriately decreases the power delivered to the lamp 24 until it reaches its nominal operating power, for example sixty watts.

To controllably vary the light intensity, a small voltage is added or subtracted to the sensed voltage input to the control circuit 60, causing the control circuit 60 to vary the switching frequency and thus the power level applied to the lamp 24. To this end, the processor 42 provides one or more output signals to an interface circuit 62 that switches an amount of voltage to be added to or subtracted from the sensed voltage. For example, a first output signal at a high level may close a solid state switch or the like in interface circuit 62 to add an appropriate amount of voltage, thereby resulting in a decrease in the power level, while a second output signal at a high level may be similarly employed to subtract an appropriate amount to increase the power. Alternatively, a digital-to-analog voltage converter may be incorporated into the interface circuit 62 to enable the processor 42 to offset the sensed voltage level, and consequently the power level, over a substantial number of values. In any event, the control circuit 60 adjusts the switching frequency and therefore the power level according to the sensed voltage as offset by voltages controlled by the processor 42. Similar ballast circuitry for controlling lamp intensity is described in the related copending U.S. Patent Application entitled "Flashing Lighting System Using a Discharge Light Source," by Joseph M. Allison et al., Ser. No., 08/328,713, filed Feb. 2, 1995.

Another benefit arising from the ability to control the power to lamp 24 is that the lamp 24 may be operated in a low power, standby mode. In the standby mode, the lamp 24 remains ignited at a low power level, ready for near-instantaneous activation to its full power. This is a significant advantage in emergency situations where a warm-up time may be dangerous. In addition, such "warm" start-ups obviate the drawing of extra power that occurs during a cold start-up, a condition which is stressful to the ballast circuit 26, the lamp 24, and the power system.

It can be readily appreciated that the power settings may be varied in either discrete steps or in gradual increments. For example, the intensity may vary in a manner corresponding to a ramped function, a sinusoidal function, or virtually any function.

Turning to an explanation of an operation of the invention with particular reference to FIGS. 8–11, at step 100 (FIG. 11), the system controller 40 polls the control panel 48 in order to determine when to activate the emergency lighting system 10. As previously described, the switch typically resides on a control panel 48 or the like accessible to an operator of the vehicle 12. When the control panel 48 indicates that no emergency is present, the light engines $22_1$–$22_5$ are ordinarily in the standby mode, effectively off, although not actually extinguished so as to be able to fully operate without requiring a significant warm-up time.

Figure 9:
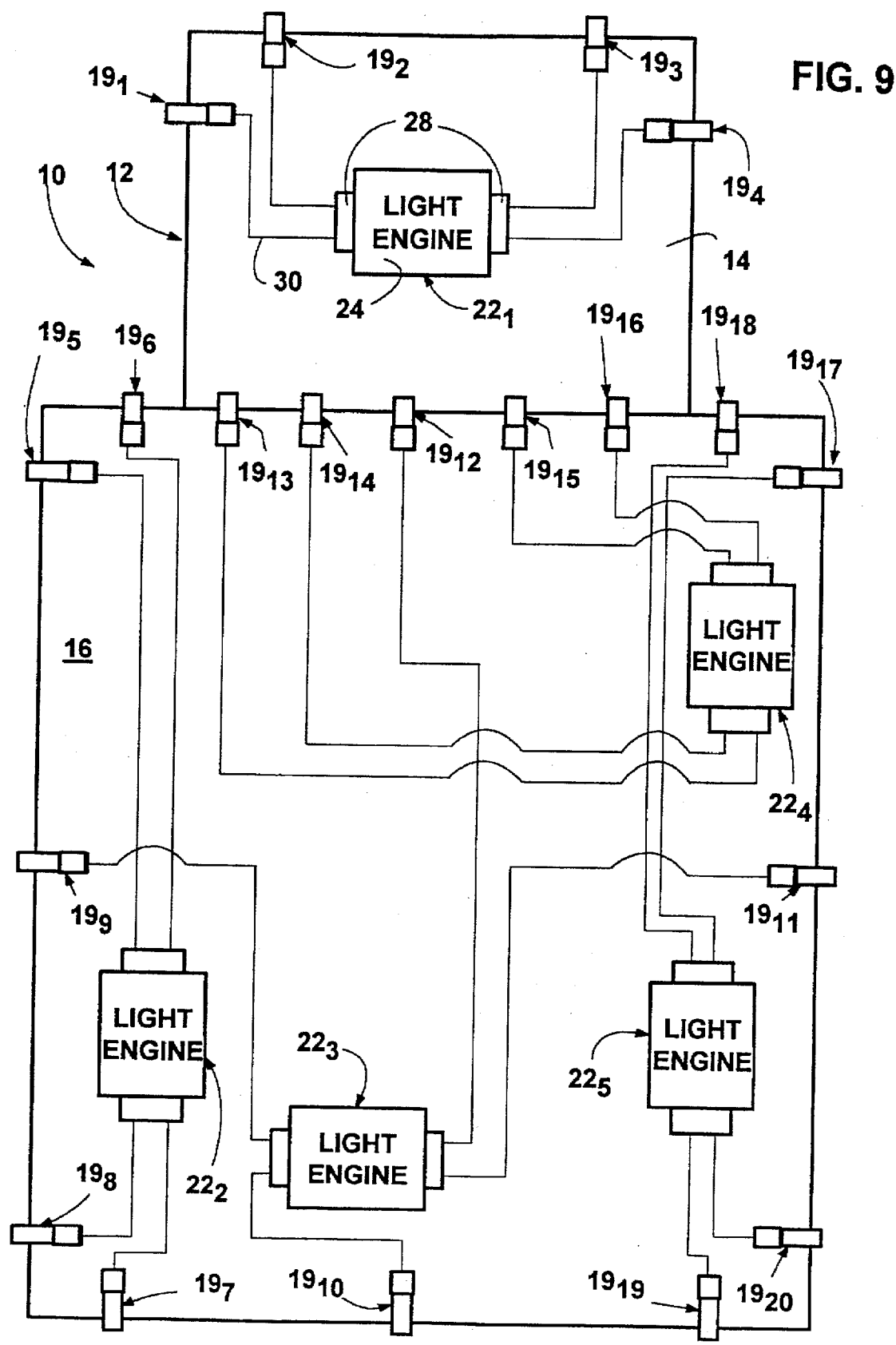
FIG. 9 is a plan view of a block diagram illustrating an alternate configuration of high intensity discharge lamps and their optical transmission paths to various display locations on an emergency vehicle.
Figure 11A:
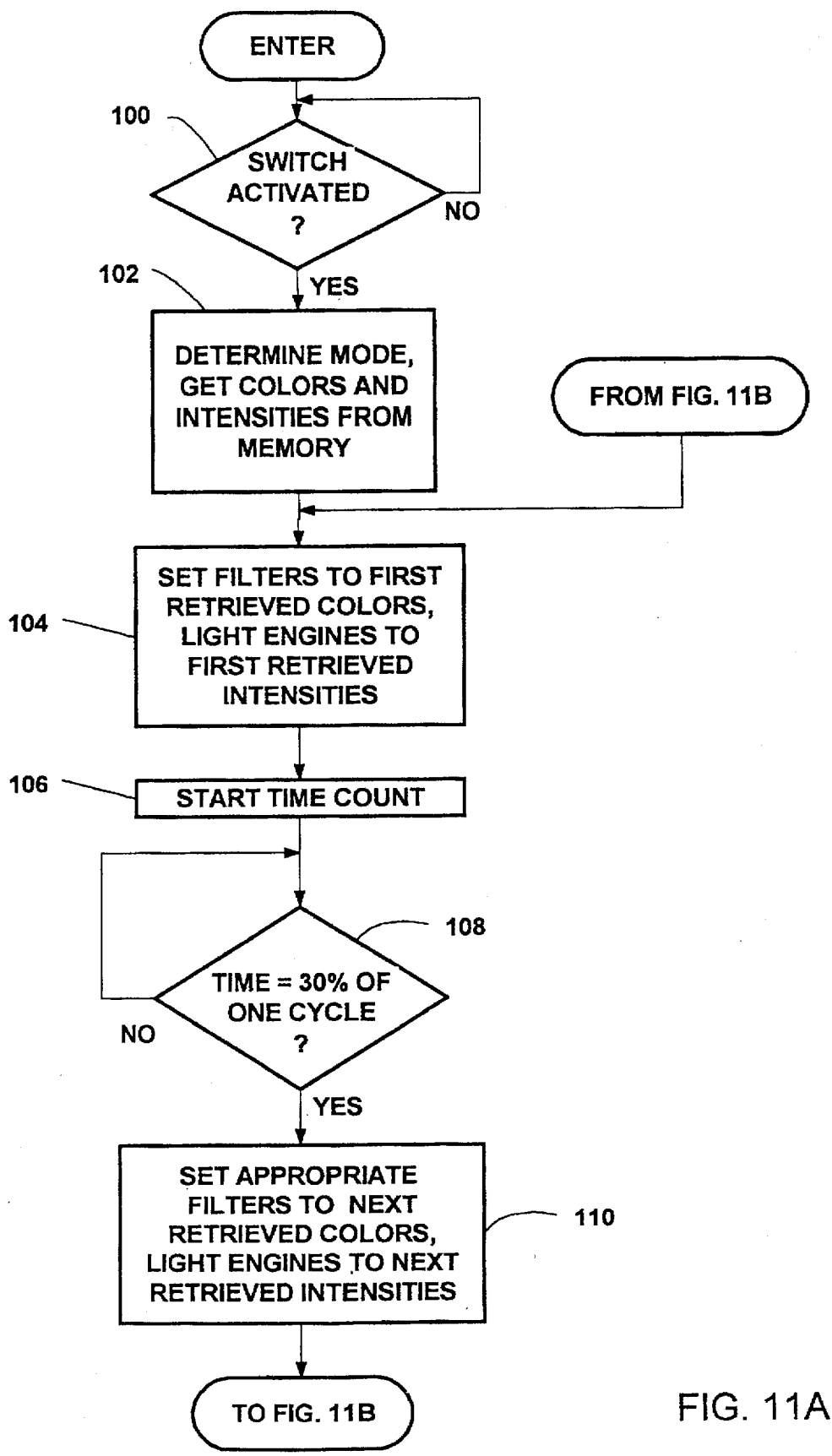
FIG. 11 is a flow diagram representing general steps for operating an emergency lighting system.
Figure 11B:
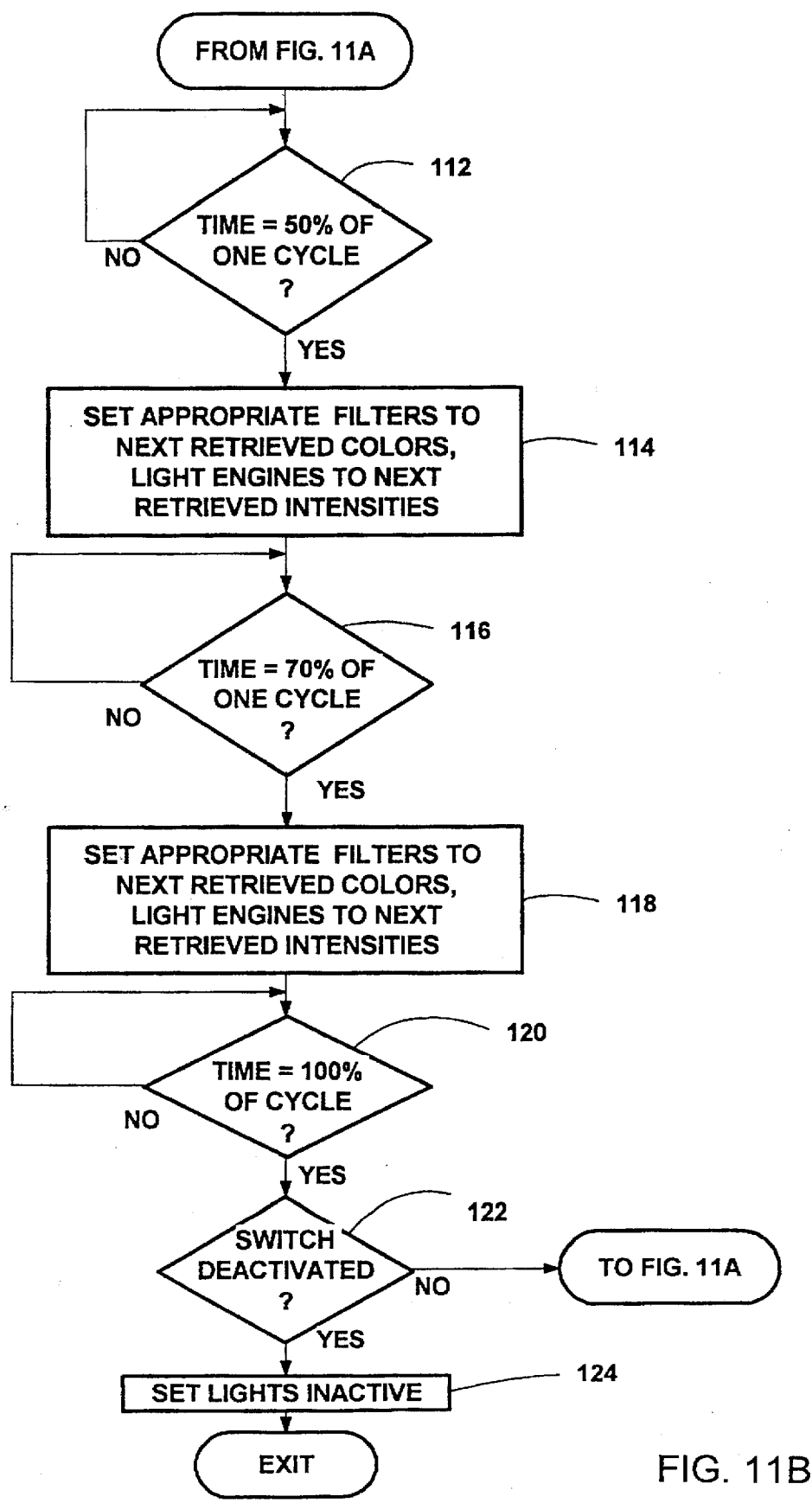

Once the actuation of a switch indicative of an emergency mode is detected, the processor 42 accesses its memory 44 at step 102 to obtain the parameters for operating the emergency lights, for example the several optical converters 32 which effectively appear to observers to be the "lights" $19_1$–$19_{20}$ of FIG. 9. It can be readily appreciated that the memory 44 is preferably non-volatile so that such settings are not lost upon an interruption of power. The switch or switches on the control panel 48 may also be used to indicate a particular mode for operating the lights $19_1$–$19_{20}$. For example, in the present invention the lights $19_9$–$19_{11}$ may either be operated as flashing lights or continuous scene lights depending on whether the vehicle is moving or parked.

FIGS. 10A and 10B represent look-up tables 81–85 in the memory 44 for a first operating mode, while FIGS. 10C and 10D represent look-up tables 91–95 for a second operating mode. For purposes of simplicity, only the first operating mode will be described herein, however it can be readily appreciated that the second operating mode functions in a similar manner. Moreover, the several display locations around the vehicle 12 will be referred to herein as lights $19_1$–$19_{20}$, although in keeping with the invention they are not the sources that originally generate the light.

When mode one is selected, the processor 42 reads the look-up table 81 for light engine $22_1$ (FIG. 9) in the memory 44 and obtains a first power setting of thirty-five Watts for a first thirty percent of the cycle, a second power setting of sixty Watts for the next forty percent of the cycle, and a third power setting of eighty-four Watts for the remaining thirty percent of the cycle. The wattage values may be reduced at night wherein a lesser intensity may be desirable, again by adjusting (increasing) the sensed voltage level.

The colors for the lights $19_1$–$19_4$ coupled to light engine $22_1$ are similarly obtained via table 81, i.e., red and white for mode one. The length of time of the cycle, for example one-half second, may be fixed, or alternatively obtained from the memory 44 or by any other suitable means.

Once the intensities, colors and times are obtained, the processor 44 sets the filters and lamps to their initial settings at step 104 and starts a timer at step 106. These settings are applied to the lights $19_1$–$19_{20}$ until the first time change, in this example thirty percent of the cycle, is detected at step 108.

At this thirty-percent time, the intensity settings and colors are changed at step 110 for certain of the lights as specified by the look-up tables. Similar color and/or intensity changes are made to the lights $19_1$–$19_{20}$ during steps 112–120. These steps will not be described in detail herein, however, the various settings may be determined by following the flow chart of FIG. 11 in conjunction with the look-up tables in FIGS. 10A–10D.

Thus, until deactivated, the process loops between steps 104–122. Accordingly, in mode one lights $19_1$–$19_6$, $19_8$–$19_9$, $19_{11}$, $19_{17}$–$19_{18}$ and $19_{20}$ will flash from white to red at thirty percent of the cycle, and back from red to white at one-hundred percent of the cycle. Lights $19_7$ and $19_{19}$ will change from amber to red and back to amber at the same times. Light $19_{10}$ will change between black and amber while light $19_{12}$ will change from black to white, again at the same percentages of the cycle. The corresponding power levels will also be modulated at thirty, seventy and one-hundred percent of the cycle as previously described.

However, unlike these particular lights, in the selected mode (mode one) lights $19_{13}$–$19_{16}$ will not change in color, remaining red, but will change in intensity, from thirty-five Watts to eighty-four Watts. As specified in look-up table 84 of FIG. 10B, these changes will occur at fifty percent and one-hundred percent of the one-half second cycle.

The lights are cycled in this manner until at step 122 the control panel 48 switch is determined to be deactivated, at which time the lights $19_1$–$19_{20}$ are ordinarily returned to their stand-by mode. Of course, the detection of the deactivation may occur at any time in the process, for example by way of a hardware interrupt. Moreover, the control panel 48 may alternatively indicate a change in operating mode instead of indicating complete deactivation of the lights.

Figure 8:
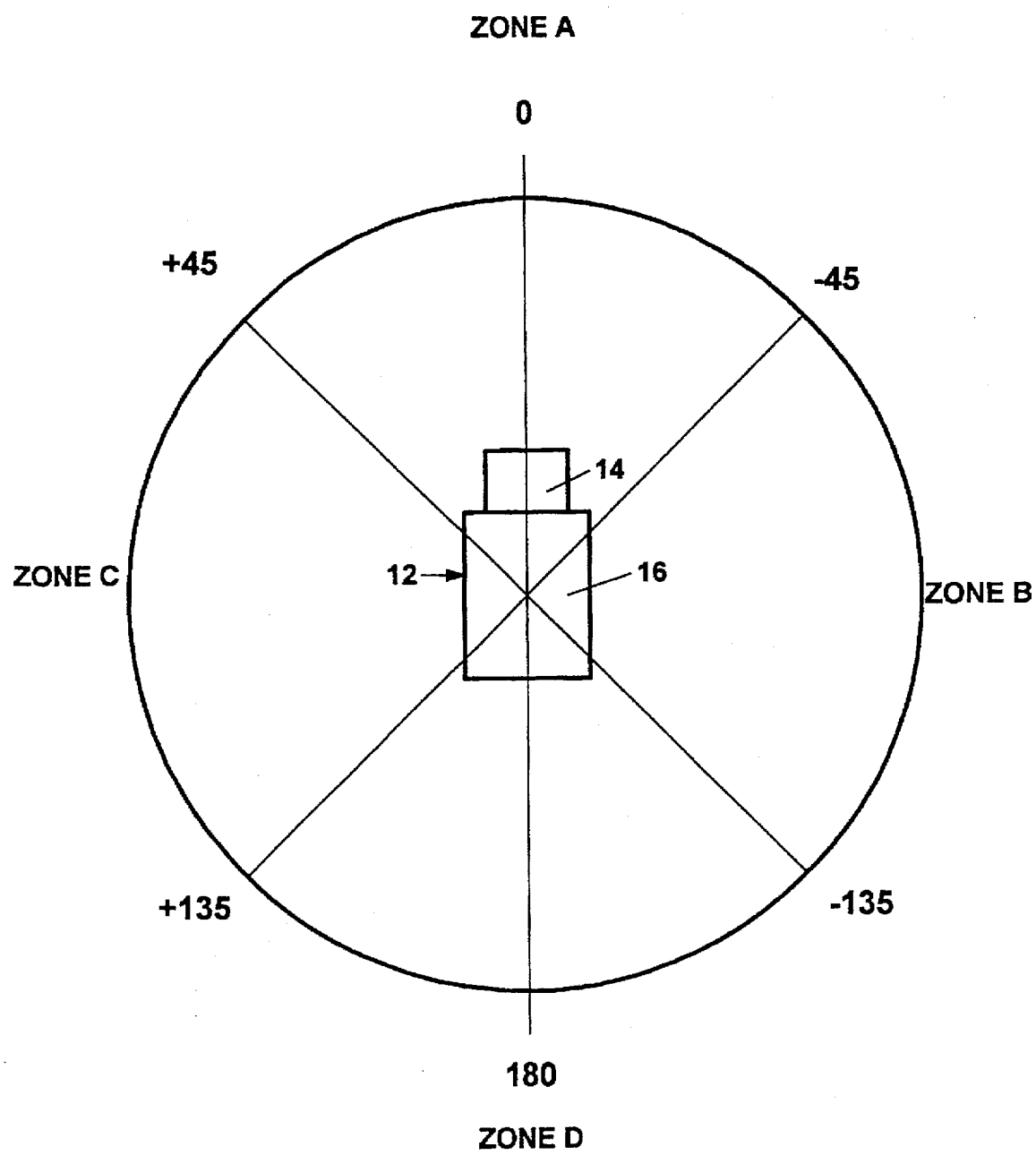
FIG. 8 is plan view illustrating four distinct illumination zones around an emergency vehicle as designated by a representative specification.

Although no particular settings or patterns are necessary to the invention, the settings described above have been selected to comply with at least one standard specification. For example, as shown in FIG. 8, in the AMD specification no white lights may appear in ZONE D, between +135 and −135 degrees, and similarly, no amber lights may appear in ZONE A, between +45 and −45 degrees. To ensure that the standards are met, the optical converters 32 are selected and arranged on the vehicle body so as to not broadcast the light outside of these limits, and the look-up tables have been appropriately recorded in memory 44 to properly modulate the output colors.

In alternative arrangements, it may be desirable to have the light pipes 30 arranged so that all of the light on any one side of the vehicle 12 does not originate from a common light engine. With such a configuration, at least some light will be visible from all directions in the event that one of the light engines $22_1$–$22_n$ fails.

Finally, the present invention allows lights $19_9$–$19_{11}$ to serve as both flashing lights and scene lights. For emergency lighting, the processor 42 modulates the corresponding filters 34 between two or more color settings, ordinarily in conjunction with the intensity as previously described. For scene lighting, the processor 42 adjusts the filters 34 to an unfiltered setting and sets the intensity as desired, generally to the normal operating intensity of the lamp $22_3$.

Figure 13:
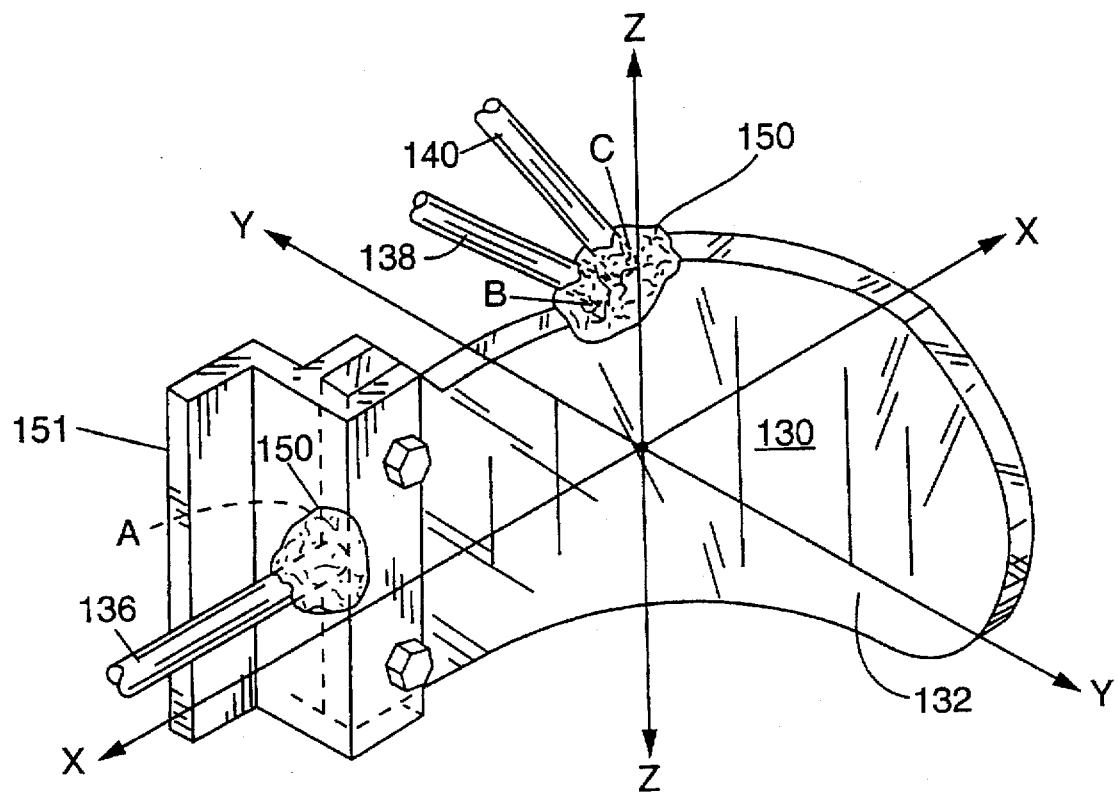
FIG. 13 is a perspective of a converter according to one important aspect of the invention wherein a single converter provides three distinctly oriented beams.
Figure 14:
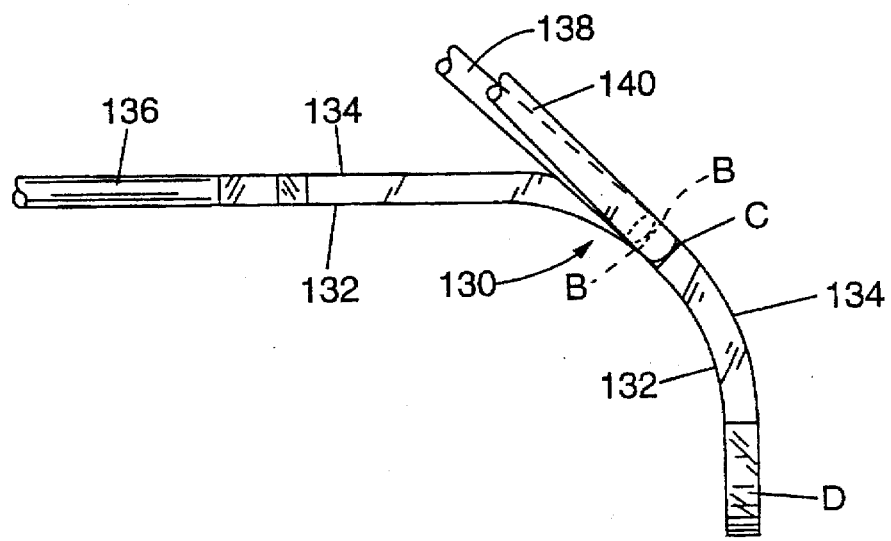
FIG. 14 is a top plan view of the converter illustrated in FIG. 13.
Figure 15:
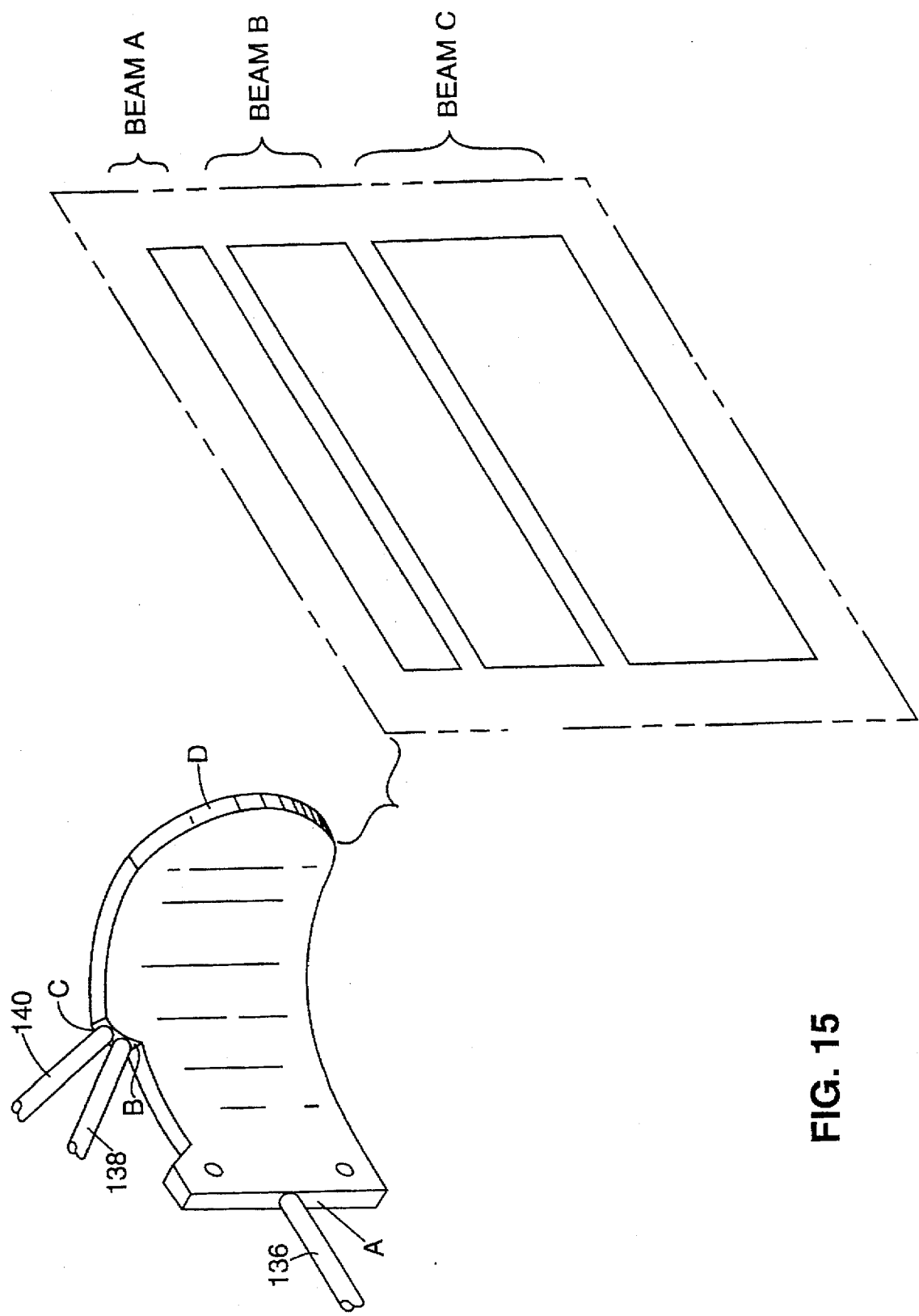
FIG. 15 is a perspective view of the converter of FIGS. 13 and 14 and the projection of the far-field pattern formed by the three beams of light broadcast by the converter.

Turning to FIGS. 13–20, another aspect of the invention contemplates a single converter 130 optically configured to receive light from among a plurality of light beams and to broadcast those beams at predetermined horizontal and vertical output angles. To accomplish this, the converter 130 has more than one input facet coupled to a common output facet. As best shown in FIGS. 17($a$)–17($c$), the output facet D launches a beam in response to the injection of light from a light pipe into one of the input facets A, B or C. As shown in FIG. 15, each output beam resulting from light injected into the converter 130 from one of the input facets A, B or C is distinctly oriented with respect to the other beams.

As a result, seven distinct outputs are possible from the injection of light into input facets A, B and C. Specifically, light injected into each one of the input facets A, B or C may be individually converted to a distinct directed output beam launched from the output facet D, providing three of the possible outputs. An additional output signal can be generated at the output facet D by the simultaneous injection of light into all three of the input facets. Finally, three other distinct outputs can be generated by injecting light into the converter at all possible combinations of two of the three input facets—i.e., (A and B), (A and C) or (B and C). However, as explained more fully hereinafter, in accordance with typical emergency vehicle needs, light is ordinarily injected into the converter 130 at only one of the input facets A, B or C at any given time.

The converter 130 includes opposing sidewalls 132, 134, which are vertically aligned along the z-axis of FIG. 13 and curved in the x-y plane (hereinafter called "the reference plane P"). The surface of each input facet A, B, and C of the converter 130 is substantially planar, with a plane coincident with the surface of the facet being at an angle with respect to the horizontal reference plane P. The thickness of the plastic from which the converter 130 is formed defines an edge, which includes the surface of each of the input facets A, B and C. Thus, the planar surface of each input facet A, B and C forms a 90° angle with each of the side walls 130, 132.

Preferably, the converter 130 is formed from a monolithic piece of transparent acrylic plastic with the input facets A, B and C formed in portions of the edge between the opposing walls 130, 132. Likewise, the output facet D is formed from a portion of the edge of the monolithic piece. The input facets A, B and C and output facet D are highly polished to ensure total internal reflection using well known polishing techniques. In manufacturing, the converter may be injection molded using conventional injection molding techniques with a highly polished mold to provide the desired level of optical integrity (e.g., SPI/SPE 1).

As best shown in FIGS. 14 and 15, input facets B and C are formed from a top portion of the edge of the monolithic piece of acrylic plastic in order to generate output beams launched from the output facet D that are angled downwardly with respect to the horizontal reference plane P. In contrast, the input facet A is formed along a portion of the edge of the monolithic piece of acrylic plastic opposite the edge forming the output facet D and aligned with the output facet to broadcast an output beam that is centered about the reference horizontal plane P.

The angles of the plane surfaces of the input facets A, B and C (with respect to the horizontal reference plane P) are determined by the desired angle of the output beam with respect to the same plane. The relationship between the angles of an input facet and the output beam it generates with respect to the horizontal reference plane P is determined empirically using a computer model, more particularly a personal computer executing the application program Opticad™ for Windows™, version 3.2, published by Opticad™ Corporation, Santa Fe, N. Mex. In this regard, applicants have employed well known ray tracing techniques to determine the angle of the input facets A, B and C for desired angles of the respective output beams.

Referring to FIG. 22, to inject the light into the converter 130, light pipes 136, 138 and 140 are mated to each facet A, B and C. The opposite ends of the light pipes 136, 138 and 140 are connected to an appropriate source of light such as a light engine or a modulator output, for example the light engine 221 or the variable filter $34_1$ in FIG. 5. In keeping with one aspect of the invention, the light injected into the various facets may be the same color or different colors at each facet, modulated light or light directly from a source, and originate from a common source or from a plurality of sources. By way of example, a first facet may receive light directly (i.e., via a fiber optic connection) from a light engine, a second facet may receive the wavelengths of light passed by a dichroic filter from the same or a different light engine, and a third facet may receive the wavelengths of light reflected by that dichroic filter. In an ambulance application, input facets B and C would most likely receive white light while output facet A might receive colored light either continuously or flashed.

The ends of the light pipes 136, 138 and 140 are mated to the input facets A, B and C in a known manner. More specifically, the end of each light pipe to be coupled to the converter 130 is polished and cleaned to have a flat face that is perpendicular to the longitudinal axis of the pipe. Each flat face is mated to its corresponding input facet using an epoxy resin such as Norland Type 68 (UV curing adhesive for plastics), Norland Products Inc., New Brunswick, N.J. Because the epoxy tends to be brittle, a silicon-based compound 150 in FIG. 13 may be useful for surrounding the interface between the light pipe and the input facet as a means for protecting the coupling from being damaged or fractured.

Figure 16:
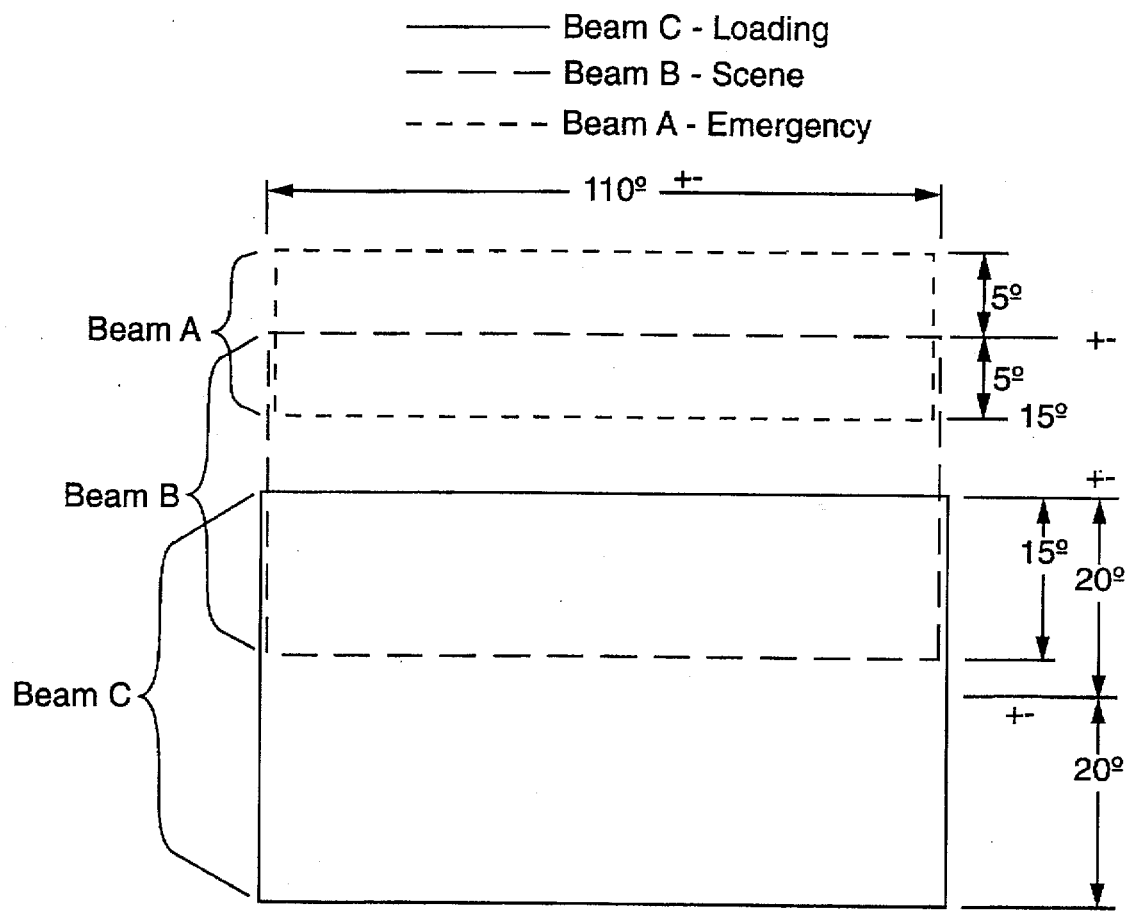
FIG. 16 is a near-field pattern of the beams generated by the converter of FIGS. 13–14.
Figure 17A:
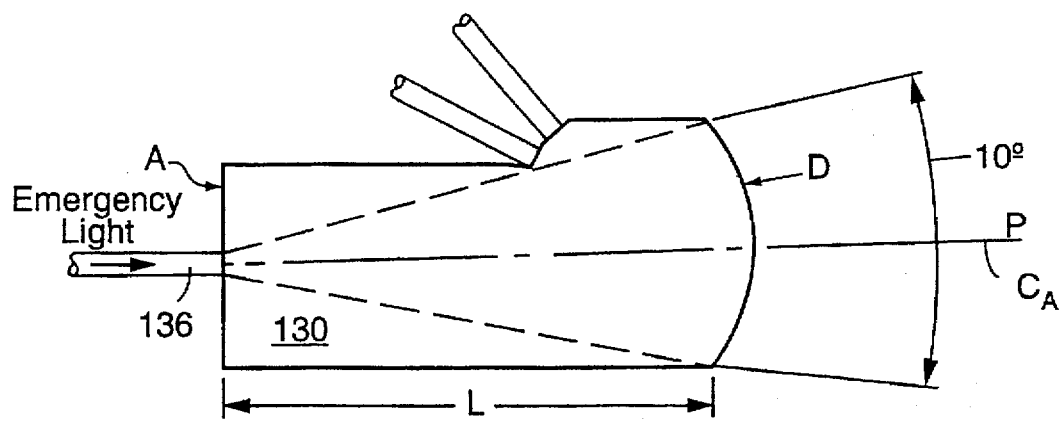
FIGS. 17(a)–17(c) are each a revolved layout of the converter viewed from a side elevation showing the path of one of the output beams from its respective input facet in a vertical plane.
Figure 17B:
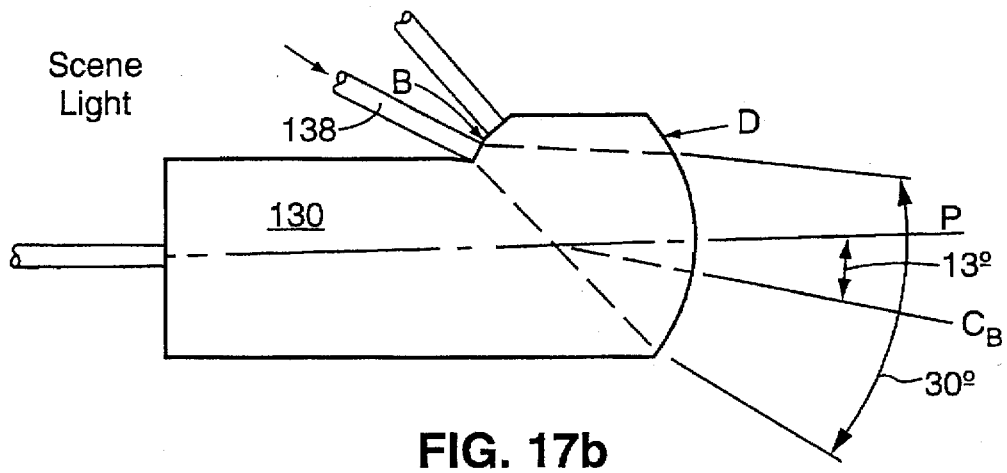
Figure 17C:
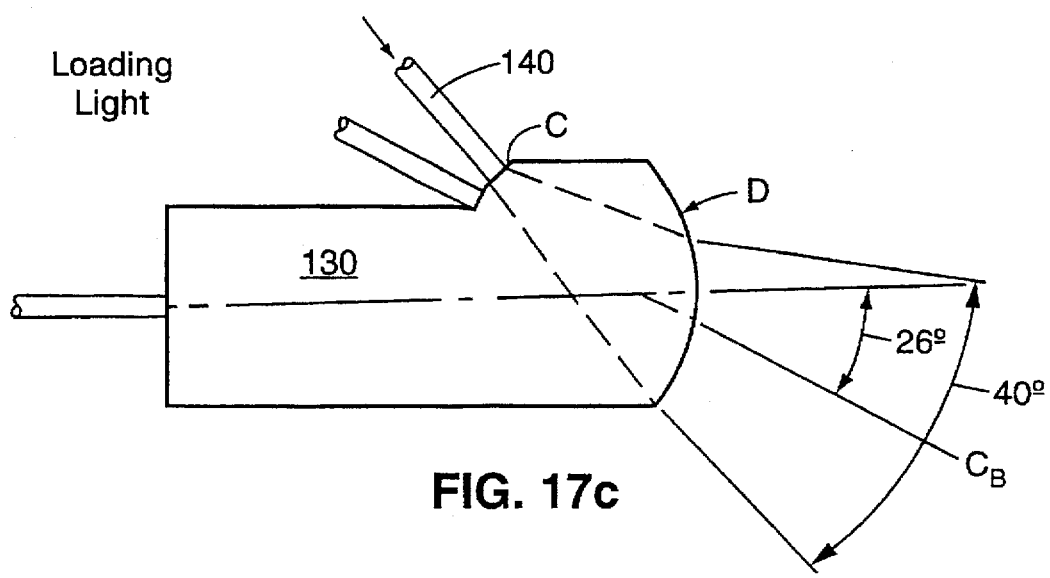

Turning to the optical properties of the converter 130, the profile of each of the output beams generated by the converter 130 in response to the injection of a light into one of the input facets A, B or C is illustrated in FIGS. 15 and 16, and in FIGS. 17a, 17b and 17c, respectively. The overall length L of the monolithic piece of acrylic plastic comprising the converter 130 is selected in part to ensure that the light launched into the converter 130 from each of the light pipes 136, 138 and 140 and its respective input facet A, B, or C is fully integrated in the converter 130 to more evenly distribute the light intensity at the output facet D. In the illustrated embodiment, the output facet D has a convex profile as indicated in FIGS. 17a–17c in order to form a lens that focuses the light launched from the output facet D. The lens formed by the convex profile of the output facet D has a focal point at approximately the surface of the input facet A and coincident with the horizontal reference plane P.

The output beam launched from the output facet D from light injected into the input facet A has a beam divergence in the vertical plane of approximately 10° as illustrated in FIGS. 17a. The output beam has a central propagation axis $C_A$ that is coincident with the horizontal reference plane P. Thus, this light beam propagates substantially horizontally, and, in an emergency vehicle application, such as the vehicle 12 of FIG. 1, the beam is preferably employed as a flashing light intended to provide an alerting function indicative of an emergency situation.

When light is injected into the converter 130 from the light pipe 138 mated to input facet B, the lens of the output facet D launches a beam having a profile in the vertical plane substantially as illustrated in FIG. 17b. This output beam diverges at an angle of approximately 30° as indicated in the illustration of FIG. 17b. The central axis $C_B$ of propagation for this output beam is directed downwardly from the horizontal reference plane P by an angle of approximately 13°. This slight downward propagation of the beam allows it to illuminate the immediate surroundings of the emergency vehicle when the converter 130 is mounted in the vehicle at an appropriate height such as the height in position of the converter $20_1$ on the vehicle 12 illustrated in FIG. 1. Light injected at facet B thus provides a selectively operable lighting system for illuminating the scene of the emergency, i.e., "scene lights".

Light injected into the converter 130 from a light pipe 140 mated to the input facet C is converted to an output beam at the output facet D that propagates downwardly from the horizontal reference plane P at an angle of approximately 26° with respect to the propagation axis $C_C$. As can be seen in FIG. 17c, the profile of the beam diverges in the vertical plane at an angle approximately 40°. The downward angle of this beam's propagation is well suited for use as a light for illuminating the ground immediately adjacent the emergency vehicle 12. Thus, this output beam is well suited for providing ground illumination around the doors of the emergency vehicle 12, for example to provide a selectively operable lighting system for loading an injured passenger into an ambulance, i.e., "load lights".

Figure 18:
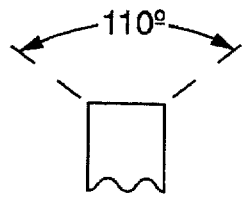
FIG. 18 is a top view of the output facet of the converter of FIGS. 13–17 showing the pattern of one of the output beams in a horizontal plane and near the surface of the lens.

FIG. 18 illustrates the angle of beam divergence in the horizontal reference plane P for each of the output beams at the output facet D. As shown, each of the output beams has an angle of approximately 110°. Because the periphery of the beam is not well defined, the perimeter of each beam in the horizontal and vertical axes has been defined as the closed contour where the beam is at approximately 10 percent of its average maximum intensity.

FIG. 15 illustrates the far-field light pattern formed by the three beams that can be launched by the converter 130. As can be appreciated from FIG. 15, this far-field pattern forms three distinct beams. In contrast, the near-field pattern, which is illustrated in FIG. 16, is characterized by an overlap among the three beams. By altering the relative placement of the input facets, those skilled in the art of optics will appreciate that the near and far-field patterns of the output beams can be adjusted to achieve different patterns than those illustrated. Such variations in the specific near and far field patterns are contemplated to be within the scope of the present invention.

Figure 19:
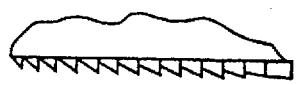
FIG. 19 is a perspective illustration of the converter of FIGS. 13–18 illustrating the converter mounted into an emergency vehicle in keeping with the invention.
Figure 19:
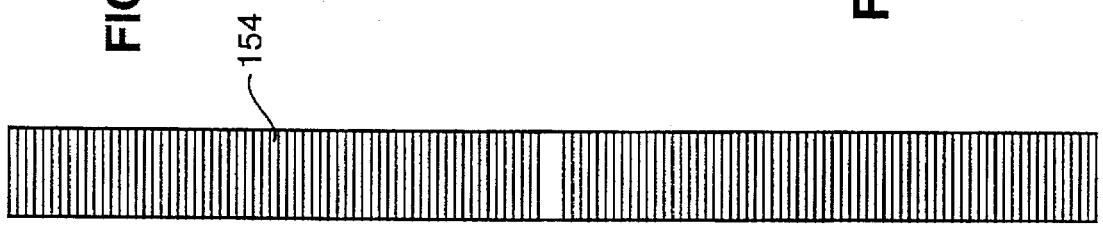
Figure 19:
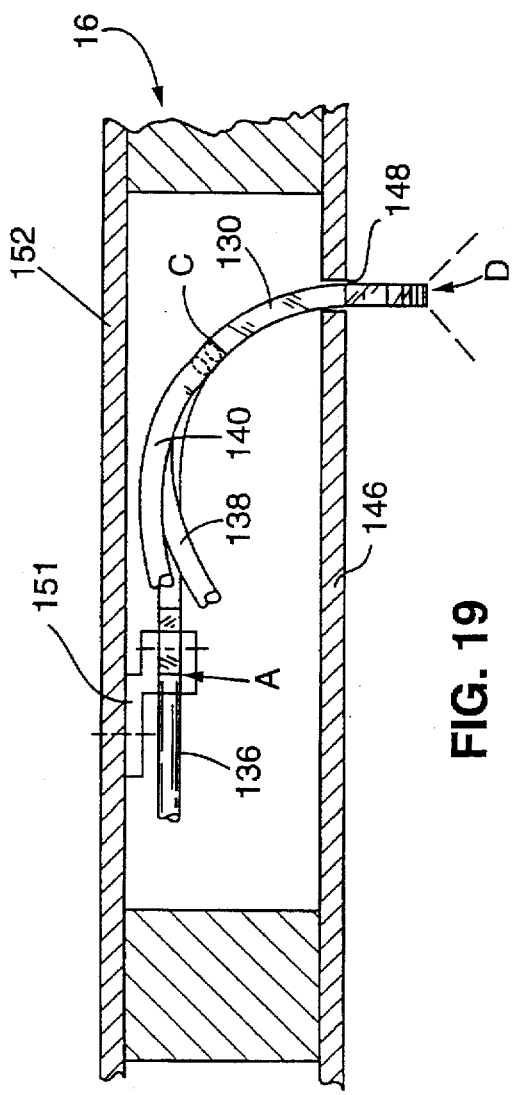

In the illustrated embodiment, the monolithic piece of acrylic plastic forming the converter 130 is curved along the length of its opposing sidewalls 132, 134. Although the curve in the monolithic piece of acrylic plastic is not necessary for proper performance of the optics functions of the converter 130, the curve or bend allows the converter to fit within the cavity between the inner and outer walls of the body 16 of the emergency vehicle 12. Referring to FIG. 19, the outer wall 146 of the body 16 of the emergency vehicle 12 includes a slot 148 through which projects the output facet D of the converter 130. Although not shown in the drawing, a suitable collar may be fitted around the portion of the converter that projects beyond the outer wall 146 of the body 16 in order to protect it.

To mount the converter 130 to the vehicle 12, the converter 130 is held in place in the slot 148 by a mounting bracket 150 that is secured to one end of the converter as best illustrated in FIG. 13 and to the inner surface of the inside wall 152 as best seen in FIG. 19. Because the distance between the inner and outer walls of the body 16 is less than the focal length of the lens formed by the output facet D, the acrylic plastic piece of the converter 130 bends about the vertical z-axis (FIG. 13) such that the entire length of the converter fits within the cavity formed between the inner and outer walls of the body 16. Because the converter 130 provides emergency, scene and load lighting, it can replace both types of converters 18 and 20 in FIGS. 1–3.

Figure 20A:
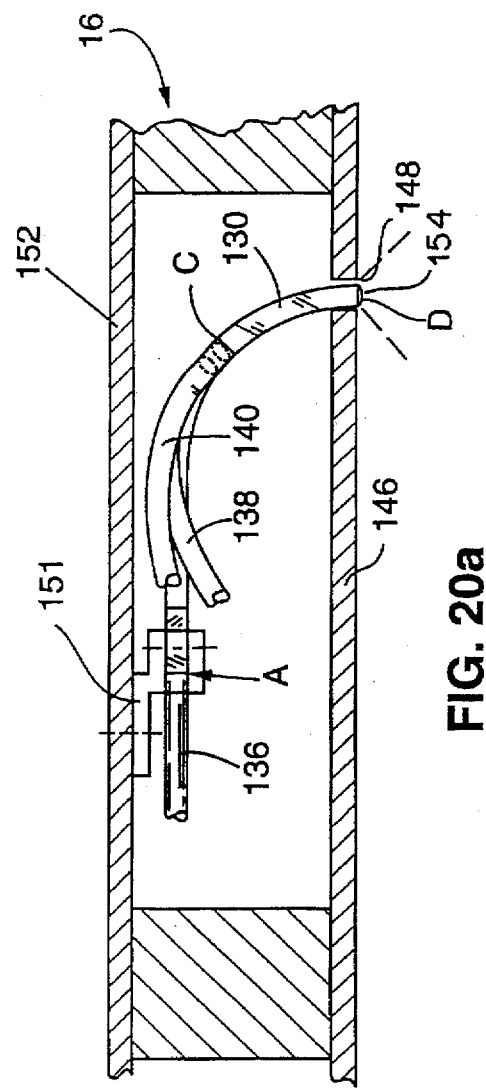
FIG. 20(a) is the same perspective view of the converter as illustrated in FIG. 19 but with the converter modified to incorporate a Fresnel lens, thereby allowing the output facet of the converter to be substantially flush with the exterior of the vehicle.
Figure 21:
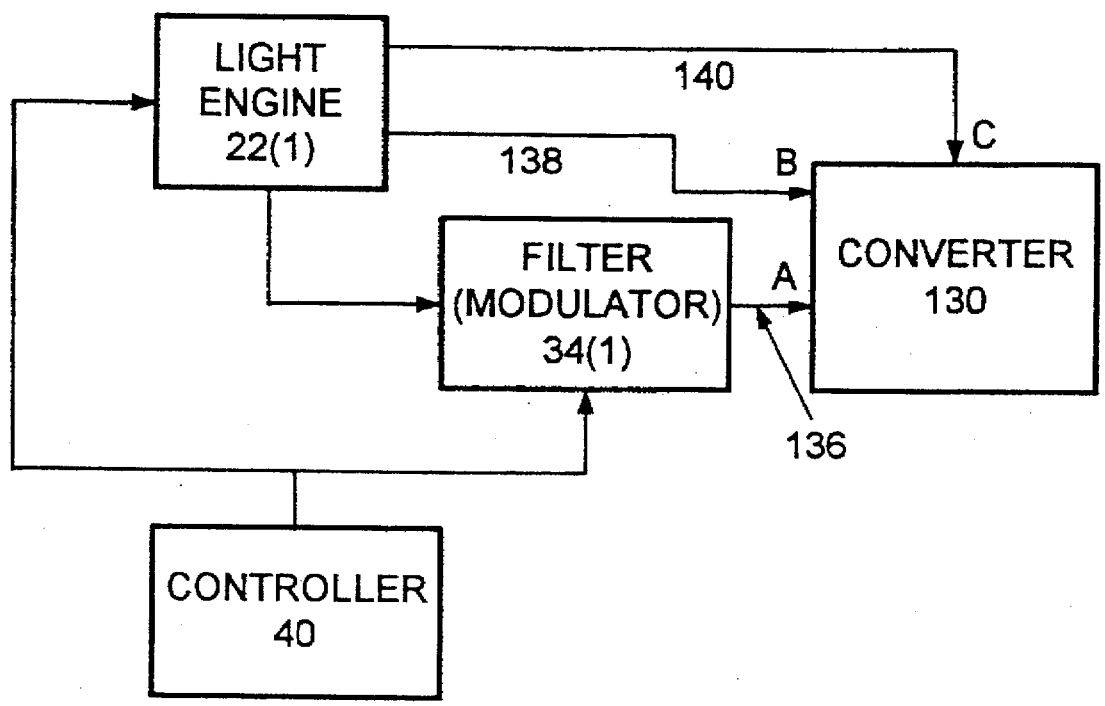
FIG. 21 is a block diagram illustrating one manner of connecting the converter of FIG. 13 to a high intensity discharge lamp in keeping with the invention.

In an alternative embodiment described with reference to FIGS. 20(a)–20(c), the convex lens formed on the facet D may instead be a Fresnel lens 154, which enables the output facet D to be substantially flush with the outer surface of the body 142. The lens 154 is preferably formed as part of the injection molding process for making the converter 130. Alternatively, it may instead may be separately formed and glued to a flat facet D. As FIGS. 20(b) and 20(c) indicate, the Fresnel lens 154 on the output facet D is characterized by a surface that in cross-section has a serrated profile as best seen in FIG. 20(c), which is characteristic of the compound lens construction of a Fresnel lens. In FIG. 20(c), the variation in the profile of the sensations from triangular to square is exaggerated as will be appreciated by those familiar with the construction of Fresnel lenses.

As can be seen from the foregoing detailed description, there is provided an emergency vehicle lighting system and method that provides warning lights to meet emergency vehicle lighting specifications without employing filament-containing bulbs. Each display location on the vehicle may be arranged to broadcast light in one or more distinct colors. The lighting system utilizes a continuous light source to efficiently provide a contrasting light pattern, and draws power in a substantially constant manner.

Moreover, the lighting system may be incorporated into a vehicle without significantly altering the profile of the vehicle. In addition, the installation and maintenance of an emergency lighting system in a vehicle is simplified. Finally, a single optical converter is provided that broadcasts multiple types of emergency lighting signals, such as modulated emergency signals, scene lighting and load lighting.

All of the references cited herein are hereby incorporated in their entireties by reference.

What is claimed is:

1. A system for generating and broadcasting lighting signals from a vehicle, comprising: means for providing distinct beams of continuous light including at least first and second beams; a modulator optically coupled to receive the first beam for modifying the properties of the first beam into modulated light periodically varying between at least two output states; and a converter optically coupled to the modulator and to the second beam by distinct fiber optic transmission paths for conveying the modulated light and the second beam to an exterior of the vehicle, thereby broadcasting from the vehicle at least one of the modulated light and the second beam.

2. The system of claim 1 wherein the modulator includes a filter having at least two selectable settings for modulating the spectral composition of the light, and a controller connected to the filter for selecting the setting thereof.

3. The system of claim 2 wherein the controller operates the filter to modulate the continuous light such that the spectral composition of the light is varied between the two output states.

4. The system of claim 2 wherein the modulator includes means for modulating the intensity of the continuous light in conjunction with the modulation of the spectral composition of the broadcasted light.

5. The lighting system of claim 1 further comprising a controller for selectively broadcasting the second beam from the vehicle and for selectively controlling the modulator to vary the modulated light in a pattern intended to communicate an emergency situation.

6. The lighting system of claim 5 wherein the controller includes a memory, and wherein the memory stores pattern information for controlling the modulator.

7. The lighting system of claim 1 wherein the means for providing distinct beams of continuous light comprises a single light source and a means for dividing the source into distinct beams of continuous light.

8. The lighting system of claim 7 wherein the means for dividing the source into distinct beams of continuous light comprises a dichroic mirror for selectively filtering one range of wavelengths of the continuous light source to provide one beam and for selectively reflecting another range of wavelengths to provide another beam.

9. The lighting system of claim 1 wherein the means for providing distinct beams of continuous light further provides a distinct third beam optically coupled to the converter and operated by the controller for selectively broadcasting the third beam from the vehicle.

10. The lighting system of claim 9 wherein the converter is optically coupled to the modulator, to the second beam and to the third beam by distinct fiber optic transmission paths, and wherein the converter includes a plurality of distinct input facets including a first facet coupled to the fiber optic path that transmits the modulated light, a second facet coupled to the fiber optic path that transmits the second beam, and a third facet coupled to the fiber optic path that transmits the third beam.

11. The lighting system of claim 1 wherein the means for providing distinct beams of continuous light includes first and second fiber optic transmission paths optically coupled to a single continuous light source.

12. The light system of claim 1 wherein the means for providing distinct beams of continuous light includes a plurality of continuous light sources.

13. The lighting system of claim 1 wherein the converter includes a plurality of distinct input facets, and wherein the fiber optic path that transmits the modulated light to the converter is coupled to one facet and the fiber optic path that transmits the second beam to the converter is coupled to another facet.

14. A system for generating and broadcasting lighting signals, comprising:

means for providing distinct beams of continuous light including at least a first beam and a second beam;

a filter optically connected to receive the first beam, the filter having at least two selectable settings for modulating the spectral composition of the received light in accordance with the setting thereof;

a converter optically connected to an output of the filter and to the second beam for broadcasting the modulated light and the second beam into an ambient atmosphere; and a controller connected to the filter for selecting the setting thereof to selectively modulate the spectral composition of the broadcasted light.

15. The lighting system of claim 14 wherein the controller controls the filter to periodically vary the modulated light in a repetitive pattern intended to communicate an emergency situation, and further controls the second beam for selective broadcasting thereof.

16. The lighting system of claim 15 wherein the controller includes a memory, and wherein the memory stores pattern information accessed by the controller for controlling the filter.

17. The lighting system of claim 14 wherein the converter is optically coupled to the filter output and to the second beam by distinct fiber optic transmission paths.

18. The lighting system of claim 17 wherein the converter includes a plurality of distinct input facets, and wherein the fiber optic path that transmits the modulated light to the converter is coupled to one facet and the fiber optic path that transmits the second beam to the converter is coupled to another facet.

19. The lighting system of claim 14 wherein the means for providing distinct beams of continuous light further provides a distinct third beam optically coupled to the converter and operated by the controller for selectively broadcasting the third beam from the vehicle.

20. The lighting system of claim 19 wherein the converter is optically coupled to the modulator, to the second beam and to the third beam by distinct fiber optic transmission paths, and wherein the converter includes a plurality of distinct input facets including a first facet coupled to the fiber optic path that transmits the modulated light, a second facet coupled to the fiber optic path that transmits the second beam, and a third facet coupled to the fiber optic path that transmits the third beam.

21. The system of claim 14 further comprising at least one fiber optic transmission medium for propagating the first beam to the filter.

22. A converter in an emergency vehicle for coupling light from a light pipe and broadcasting more than one light beam with each of the light beams having a distinct spatial orientation, the converter comprising: a monolithic piece of optically transparent material having at least two input facets for coupling to light pipes in order to inject light from the light pipes into the material and an output facet forming a lens for broadcasting the beams having distinct spatial orientations, depending on which of the input facets provides the source of the light for the beam.

* * * * *